US011483464B2

(12) United States Patent
Yamamoto

(10) Patent No.: US 11,483,464 B2
(45) Date of Patent: Oct. 25, 2022

(54) IMAGE CAPTURING APPARATUS, DEVICE, CONTROL METHOD, AND COMPUTER-READABLE STORAGE MEDIUM

(71) Applicant: CANON KABUSHIKI KAISHA, Tokyo (JP)

(72) Inventor: Naohiro Yamamoto, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 127 days.

(21) Appl. No.: 17/025,065

(22) Filed: Sep. 18, 2020

(65) Prior Publication Data

US 2021/0092272 A1 Mar. 25, 2021

(30) Foreign Application Priority Data

Sep. 20, 2019 (JP) .............................. JP2019-171852

(51) Int. Cl.
*H04N 5/232* (2006.01)
*H04N 1/21* (2006.01)
(52) U.S. Cl.
CPC ........... *H04N 5/232* (2013.01); *H04N 1/2158* (2013.01); *H04N 2201/0084* (2013.01)
(58) Field of Classification Search
None
See application file for complete search history.

(56) References Cited

U.S. PATENT DOCUMENTS

| 5,153,730 | A | * | 10/1992 | Nagasaki | ............... | H04N 5/772 |
| | | | | | | 386/E5.072 |
| 5,485,469 | A | * | 1/1996 | Suzuki | ................... | G11B 19/28 |
| | | | | | | 360/74.5 |
| 5,563,655 | A | * | 10/1996 | Lathrop | ................... | H04N 1/40 |
| | | | | | | 348/231.9 |
| 6,229,954 | B1 | * | 5/2001 | Yamagami | ............. | H04N 5/772 |
| | | | | | | 386/E5.013 |

(Continued)

FOREIGN PATENT DOCUMENTS

JP 2014060782 A 4/2014
JP 2019003384 A 1/2019

(Continued)

OTHER PUBLICATIONS

European Search Report dated Jan. 29, 2021, for corresponding European Patent Application No. 20196841.9.

(Continued)

*Primary Examiner* — James M Hannett
(74) *Attorney, Agent, or Firm* — Carter, DeLuca & Farrell LLP

(57) ABSTRACT

An image capturing apparatus, which includes a mounting part capable of attaching/detaching a device capable of at least storing a captured image, generates image data based on the captured image, if the device mounted in the mounting part can execute image analysis processing for the image data, determines, based on information obtained from the device, a method to be used to obtain a result of the image analysis processing from the device, outputs the image data to the device; and obtains the result from the device using the determined method.

10 Claims, 22 Drawing Sheets

(56) References Cited

U.S. PATENT DOCUMENTS

| | | | |
|---|---|---|---|
| 7,197,189 B2* | 3/2007 | Adelmann | G11B 20/00007 |
| | | | 348/231.2 |
| 7,392,343 B2* | 6/2008 | Oshima | G06F 3/0614 |
| | | | 711/170 |
| 7,409,477 B2* | 8/2008 | Wyatt | G06F 13/385 |
| | | | 711/2 |
| 7,656,440 B2* | 2/2010 | Watanabe | H04N 5/23225 |
| | | | 711/115 |
| 8,269,996 B2 | 9/2012 | Yamamoto | |
| 9,513,990 B2* | 12/2016 | Zhang | G06F 11/1048 |
| 2003/0193571 A1 | 10/2003 | Schultz et al. | |
| 2004/0085442 A1* | 5/2004 | Kawata | A61B 1/04 |
| | | | 348/E5.105 |
| 2010/0182655 A1 | 7/2010 | Murakata | |
| 2018/0131889 A1 | 5/2018 | Someya | |
| 2020/0204717 A1 | 6/2020 | Yamamoto | |

FOREIGN PATENT DOCUMENTS

| | | |
|---|---|---|
| TW | 201703503 A | 1/2017 |
| WO | 2016175225 A1 | 11/2016 |

OTHER PUBLICATIONS

Redmon, J. et al., "YOLO9000: Better Faster Stronger" Computer Vision and Pattern Recognition (CVPR) arXiv:1612.08242v1 (Dec. 2016) pp. 1-9.

Office Action issued by the Intellectual Property Office of China dated Mar. 21, 2022 in corresponding CN Patent Application No. 202010985687.4.

* cited by examiner

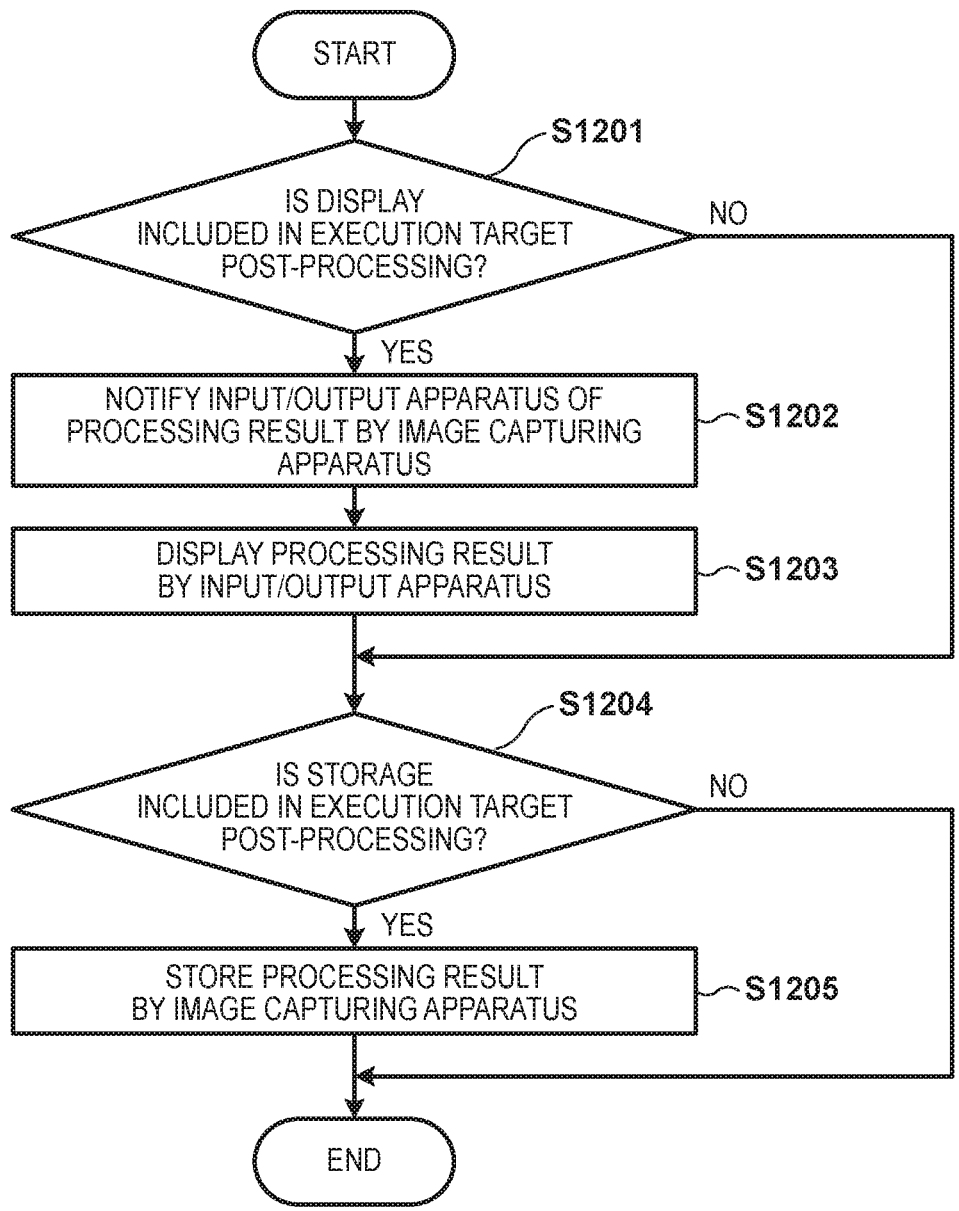

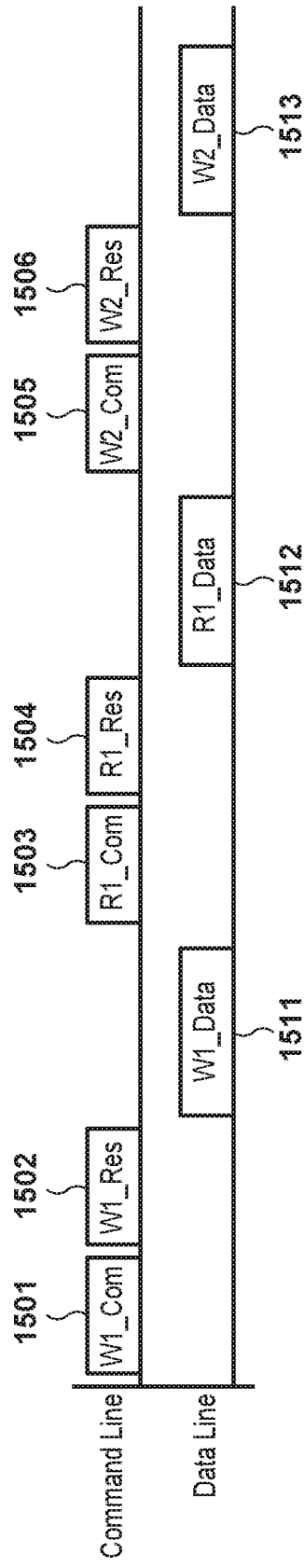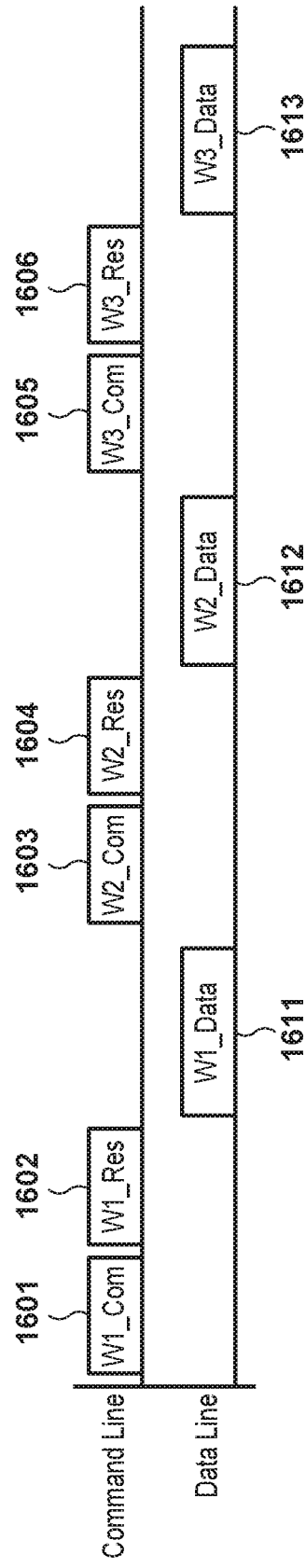

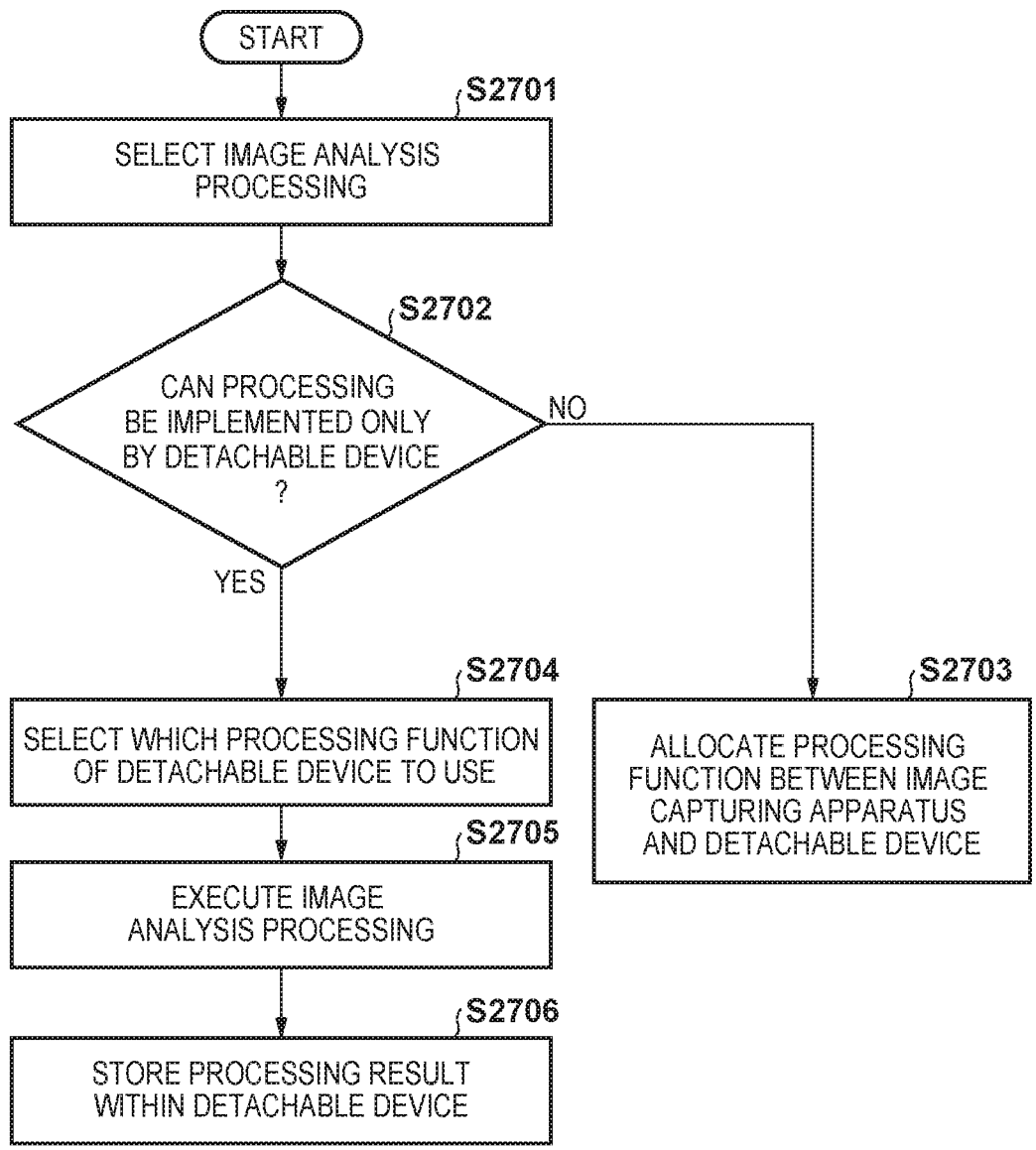

IMAGE CAPTURING APPARATUS, DEVICE, CONTROL METHOD, AND COMPUTER-READABLE STORAGE MEDIUM

BACKGROUND OF THE INVENTION

Field of the Invention

The present invention relates to a technique of speeding up data transfer.

Description of the Related Art

In recent years, image processing such as image analysis of performing object detection and tracking or performing attribute estimation, and estimation of the number of objects based on the result of such image analysis is performed in various scenes using images captured by a monitoring camera. Conventionally, such image processing has been performed by transferring videos from the monitoring camera to a high performance arithmetic apparatus such as a PC or a server that executes actual image processing. However, the recent improvement of the processing capability of mobile arithmetic apparatuses allows the monitoring camera side to perform image processing. Processing on the camera side can be executed by, for example, an arithmetic apparatus arranged in a camera main body. When the arithmetic apparatus is arranged in a detachable device such as a USB, the detachable device can execute at least a part of processing.

In a form of causing a detachable device to execute processing, certain data transfer occurs between a camera and the detachable device. A case is assumed in which the performance of whole processing such as image analysis is controlled by the data transfer speed or data transfer amount. Hence, it is important to ensure a sufficient communication band for the interface between the camera and the detachable device. Japanese Patent Laid-Open No. 2019-003384 describes a technique of, when the number of read requests whose data transfer is not completed has reached a predetermined number, making a write request wait until a read request is issued, thereby maintaining the balance of transfer between read and write and reducing the latency of read. However, the technique described in Japanese Patent Laid-Open No. 2019-003384 controls the transfer order to prevent read and write from unbalancing, and cannot improve the transfer efficiency of read and write.

The present invention provides a technique of increasing the efficiency of data transfer.

SUMMARY OF THE INVENTION

According to one aspect of the present invention, there is provided an image capturing apparatus including a mounting part capable of attaching/detaching a device capable of at least storing a captured image, comprising: a generation unit configured to generate image data based on the captured image; a determination unit configured to, if the device mounted in the mounting part can execute image analysis processing for the image data, determine, based on information obtained from the device, a method to be used to obtain a result of the image analysis processing from the device; an output unit configured to output the image data to the device; and an obtaining unit configured to obtain the result from the device using the method determined by the determination unit.

According to another aspect of the present invention, there is provided an image capturing apparatus including a mounting part capable of attaching/detaching a device capable of at least storing a captured image, comprising: a generation unit configured to generate image data based on the captured image; an output unit configured to output, to the device, the image data and a command used to output the image data by the image capturing apparatus to the device mounted in the mounting part; and an obtaining unit configured to, if the device can execute image analysis processing for the image data, receive a response to the command, the response including a result of the image analysis processing, thereby obtaining the result.

According to still another aspect of the present invention, there is provided a device that is capable of at least storing a captured image and is mounted in an image capturing apparatus including a mounting part capable of attaching/detaching the device, the device comprising: a processing unit configured to execute image analysis processing for image data based on an image captured by the image capturing apparatus; an obtaining unit configured to obtain, from the image capturing apparatus, the image data and a command used to output the image data by the image capturing apparatus to the device; and a transmission unit configured to transmit a response to the command to the image capturing apparatus, the response including a result of the image analysis processing.

Further features of the present invention will become apparent from the following description of exemplary embodiments (with reference to the attached drawings).

BRIEF DESCRIPTION OF THE DRAWINGS

FIG. 12 is a flowchart showing an example of the procedure of control of executing post-processing;

FIG. 15 is a view showing an example of the procedure of data transmission/reception in a case in which a processing result is transmitted/received using a read command;

FIG. 16 is a view showing the first example of the procedure of data transmission/reception in a case in which a processing result is transmitted/received using a command response;

FIG. 27 is a flowchart showing an example of the procedure of selection processing of a processing function to be used.

DESCRIPTION OF THE EMBODIMENTS

Figure 1:
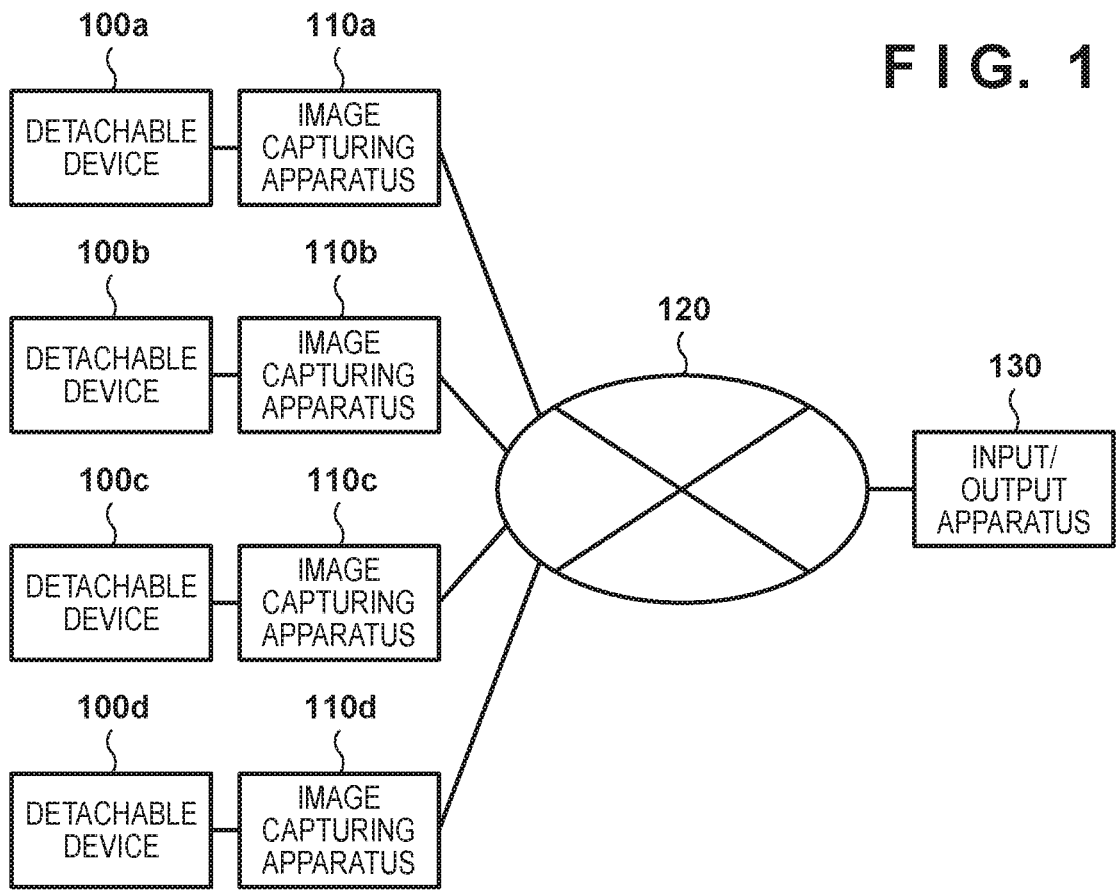
FIG. 1 is a block diagram showing an example of a system arrangement.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

<System Arrangement>

FIG. 1 shows an example of a system arrangement according to this embodiment. As an example, a case in which this system is a specific person tracking system will be described below. However, the present invention is not limited to this, and the following argument can be applied to an arbitrary system for analyzing an image and performing predetermined information output. This system is configured to include image capturing apparatuses 110a to 110d, a network 120, and an input/output apparatus 130. Note that the image capturing apparatuses 110a to 110d each include a slot to/from which a device capable of recording, for example, a captured image can be attached/detached, and when the detachable devices 100a to 100d are inserted into the slots, the image capturing apparatuses 110a and 110d are connected to the detachable devices 100a to 100d. Note that the detachable devices 100a to 100d will be referred to as "detachable devices 100", and the image capturing apparatuses 110a to 110d will be referred to as "image capturing apparatuses 110" hereinafter.

The detachable device 100 is an arithmetic device attachable/detachable to/from the image capturing apparatus 110. As an example, the detachable device 100 is a device with a predetermined processing circuit mounted in an SD card. The detachable device 100 is configured to be inserted as a whole into the image capturing apparatus 110 in a form of, for example, an SD card, and can therefore be configured to be connectable to the image capturing apparatus 110 without making any portion project from the image capturing apparatus 110. Alternatively, the detachable device 100 may be configured such that, for example, a half or more of it can be inserted into the image capturing apparatus 110, and may therefore be configured to be connectable to the image capturing apparatus 110 while making a portion project a little from the image capturing apparatus 110. This can prevent the detachable device 100 from interfering with an obstacle such as a wiring and raise the convenience when using the device. In addition, since an SD card slot is prepared in a lot of existing image capturing apparatuses 110 such as a network camera, the detachable device 100 can provide an extension function to the existing image capturing apparatus 110. Note that other than the form of an SD card, the detachable device 100 may be configured to be mounted in the image capturing apparatus 110 via an arbitrary interface used when mounting a storage device capable of storing an image captured by at least the image capturing apparatus 110. For example, the detachable device 100 may include a USB (Universal Serial Bus) interface, and may be configured to be mounted in a USB socket of the image capturing apparatus 110. The predetermined processing circuit is implemented by, for example, an FPGA (Field Programmable Gate Array) programmed to execute predetermined processing but may be implemented in another form.

The image capturing apparatus 110 is an image capturing apparatus such as a network camera. In this embodiment, the image capturing apparatus 110 incorporates an arithmetic apparatus capable of processing a video but is not limited to this. For example, an external computer such as a PC (Personal Computer) connected to the image capturing apparatus 110 may exist, and the combination may be handled as the image capturing apparatus 110. Additionally, in this embodiment, the detachable devices 100 are mounted in at least one of the image capturing apparatuses 110. Note that FIG. 1 shows four image capturing apparatuses 110, and the detachable devices mounted in these. The number of combinations of devices may be three or less, or five or more. When the detachable device 100 having an image analysis processing function is mounted in the image capturing apparatus 110, video processing can be executed on the side of the image capturing apparatus 110 even if the image capturing apparatus 110 does not have the image analysis processing function. Also, in a form in which an arithmetic apparatus for video processing is arranged in the image capturing apparatus 110, as in this embodiment, image processing executable on the side of the image capturing apparatus 110 can be diversified/sophisticated by mounting the detachable device 100 including an arithmetic apparatus in the image capturing apparatus 110.

The input/output apparatus 130 is an apparatus that performs acceptance of input from a user and output of information (for example, display of information) to the user. In this embodiment, for example, the input/output apparatus 130 is a computer such as a PC, and information is input/output by a browser or a native application installed in the computer.

The image capturing apparatuses 110 and the input/output apparatus 130 are communicably connected via the network 120. The network 120 is configured to include a plurality of routers, switches, cables, and the like, which satisfy the communication standard of, for example, Ethernet®. In this embodiment, the network 120 can be an arbitrary network that enables communication between the image capturing apparatus 110 and the input/output apparatus 130, and can be constructed by an arbitrary scale and arrangement and a communication standard to comply with. For example, the network 120 can be the Internet, a wired LAN (Local Area Network), a wireless LAN, a WAN (Wide Area Network), or the like. The network 120 can be configured such that, for example, communication by a communication protocol complying with the ONVIF (Open Network Video Interface Forum) standard is possible. However, the network 120 is not limited to this and may be configured such that, for example, communication by another communication protocol such as a unique communication protocol is possible.

<Apparatus Arrangement>

(Arrangement of Image Capturing Apparatus)

Figure 2:
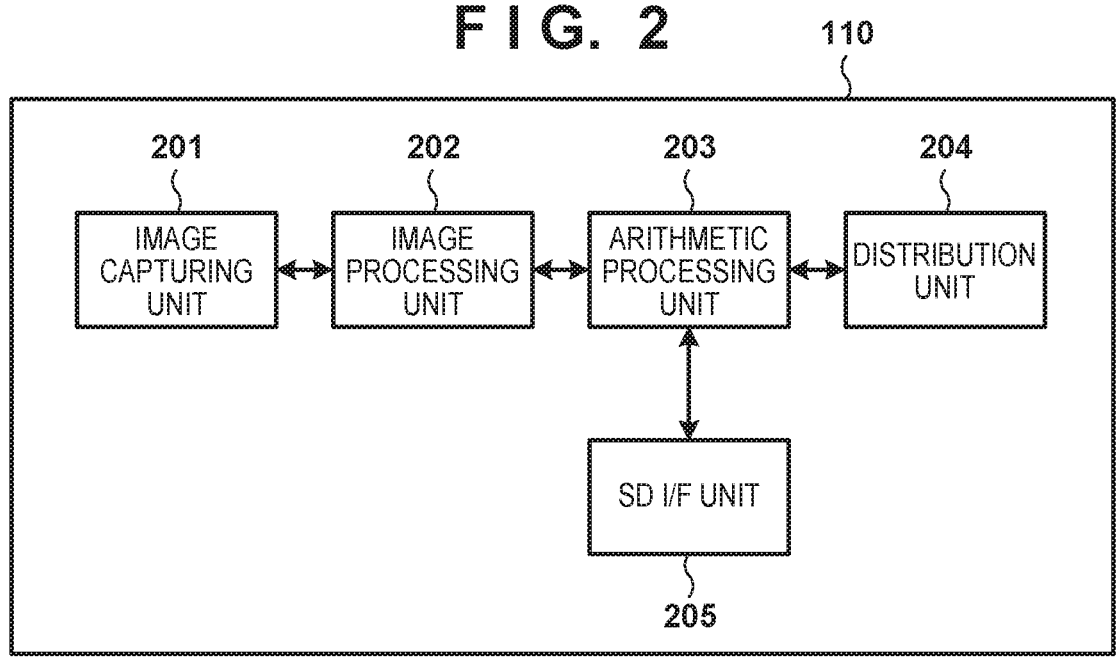
FIG. 2 is a block diagram showing an example of the hardware arrangement of an image capturing apparatus.

The arrangement of the image capturing apparatus 110 will be described next. FIG. 2 is a block diagram showing an example of the hardware arrangement of the image capturing apparatus 110. As the hardware arrangement, the image capturing apparatus 110 includes, for example, an image capturing unit 201, an image processing unit 202, an arithmetic processing unit 203, a distribution unit 204, and an SD I/F unit 205. Note that I/F is an abbreviation of interface.

The image capturing unit 201 is configured to include a lens portion configured to form an image of light, and an image capturing element that performs analog signal conversion according to the formed image of light. The lens portion has a zoom function of adjusting an angle of view, a stop function of adjusting a light amount, and the like. The image capturing element has a gain function of adjusting sensitivity when converting light into an analog signal. These functions are adjusted based on set values notified from the image processing unit 202. The analog signal obtained by the image capturing unit 201 is converted into a digital signal by an analog-to-digital conversion circuit and transferred to the image processing unit 202 as an image signal.

The image processing unit 202 is configured to include an image processing engine, and peripheral devices thereof. The peripheral devices include, for example, a RAM (Random Access Memory), the drivers of I/Fs, and the like. The image processing unit 202 performs, for example, image processing such as development processing, filter processing, sensor correction, and noise removal for the image signal obtained from the image capturing unit 201, thereby generating image data. The image processing unit 202 can also transmit set values to the lens portion and the image capturing element and execute exposure adjustment to obtain an appropriately exposed image. The image data generated by the image processing unit 202 is transferred to the arithmetic processing unit 203.

The arithmetic processing unit 203 is formed by at least one processor such as a CPU or an MPU, memories such as a RAM and a ROM, the drivers of I/Fs, and the like. Note that CPU is the acronym of Central Processing Unit, MPU is the acronym of Micro Processing Unit, RAM is the acronym of Random Access Memory, and ROM is the acronym of Read Only Memory. In an example, the arithmetic processing unit 203 can determine allocation concerning which one of the image capturing apparatus 110 and the detachable device 100 should execute each portion of processing to be executed in the above-described system, and execute processing corresponding to the allocation. Details of processing contents and processing allocation will be described later. The image received from the image processing unit 202 is transferred to the distribution unit 204 or the SD I/F unit 205. The data of the processing result is also transferred to the distribution unit 204.

The distribution unit 204 is configured to include a network distribution engine and, for example, peripheral devices such as a RAM and an ETH PHY module. The ETH PHY module is a module that executes processing of the physical (PHY) layer of Ethernet. The distribution unit 204 converts the image data or the data of the processing result obtained from the arithmetic processing unit 203 into a format distributable to the network 120, and outputs the converted data to the network 120. The SD I/F unit 205 is an interface portion used to connect the detachable device 100, and is configured to include, for example, a power supply, and a mounting part such as an attaching/detaching socket used to attach/detach the detachable device 100. Here, the SD I/F unit 205 is configured in accordance with the SD standard formulated by the SD Association. Communication between the detachable device 100 and the image capturing apparatus 110, such as transfer of an image obtained from the arithmetic processing unit 203 to the detachable device 100 or data obtaining from the detachable device 100, is performed via the SD I/F unit 205.

Figure 3:
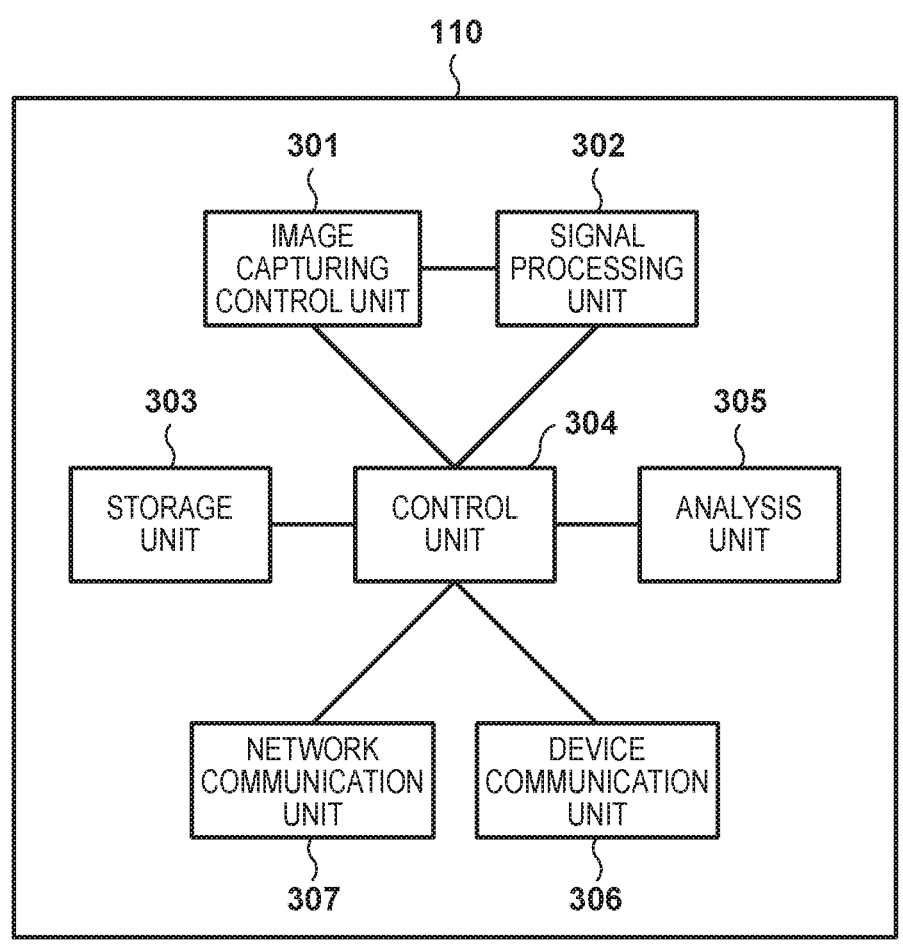
FIG. 3 is a block diagram showing an example of the functional arrangement of the image capturing apparatus.

FIG. 3 shows an example of the functional arrangement of the image capturing apparatus 110. The image capturing apparatus 110 includes, as its functions, for example, an image capturing control unit 301, a signal processing unit 302, a storage unit 303, a control unit 304, an analysis unit 305, a device communication unit 306, and a network communication unit 307.

The image capturing control unit 301 executes control of capturing the peripheral environment via the image capturing unit 201. The signal processing unit 302 performs predetermined processing for the image captured by the image capturing control unit 301, thereby generating data of the captured image. The data of the captured image will simply be referred to as the "captured image" hereinafter. The signal processing unit 302, for example, encodes the image captured by the image capturing control unit 301. The signal processing unit 302 performs encoding for a still image using, for example, an encoding method such as JPEG (Joint Photographic Experts Group). The signal processing unit 302 performs encoding for a moving image using an encoding method such as H.264/MPEG-4 AVC (to be referred to as "H.264" hereinafter) or HEVC (High Efficiency Video Coding). The signal processing unit 302 may encode an image using an encoding method selected by the user from a plurality of encoding methods set in advance via, for example, an operation unit (not shown) of the image capturing apparatus 110.

The storage unit 303 stores a list (to be referred to as a "first processing list" hereinafter) of analysis processing executable by the analysis unit 305 and a list of post-processes for a result of analysis processing. The storage unit 303 also stores a result of analysis processing to be described later. Note that in this embodiment, processing to be executed is analysis processing. However, arbitrary processing may be executed, and concerning processing associated with the processing to be executed, the storage unit 303 may store the first processing list and the list of post-processes. The control unit 304 controls the signal processing unit 302, the storage unit 303, the analysis unit 305, the device communication unit 306, and the network communication unit 307 to execute predetermined processing.

The analysis unit 305 selectively executes at least one of pre-analysis processing, analysis processing, and post-analysis processing to be described later for a captured image. Pre-analysis processing is processing to be executed for a captured image before analysis processing to be described later is executed. In the pre-analysis processing according to this embodiment, as an example, processing of dividing a captured image to create divided images is executed. Analysis processing is processing of outputting information obtained by analyzing an input image. In the analysis processing according to this embodiment, as an example, processing of receiving a divided image obtained by pre-analysis processing, executing at least one of human body detection processing, face detection processing, and vehicle detection processing, and outputting the analysis processing result is executed. The analysis processing can be processing configured to output the position of an object in a divided image using a machine learning model that has learned to detect an object included in an image using, for example, the technique in J. Redmon and A. Farhadi "YOLO9000: Better Faster Stronger" Computer Vision and Pattern Recognition (CVPR) 2016. Post-analysis processing is processing to be executed after analysis processing is executed. In the post-analysis processing according to this embodiment, as an example, processing of outputting, as a processing result, a value obtained by adding the numbers of objects detected in those divided images based on the analysis processing result for each divided image is executed. Note that the analysis processing may be processing of detecting an object in an image by performing pattern matching and outputting the position of the object.

The device communication unit 306 performs communication with the detachable device 100. The device communication unit 306 converts input data into a format processable by the detachable device 100, and transmits data obtained by the conversion to the detachable device 100. In addition, the device communication unit 306 receives data from the detachable device 100, and converts the received data into a format processable by the image capturing apparatus 110. In this embodiment, as the conversion processing, the device communication unit 306 executes processing of converting a decimal between a floating point format and a fixed point format. However, the present invention is not limited to this, and another processing may be executed by the device communication unit 306. Additionally, in this embodiment, the device communication unit 306 transmits a command sequence determined in advance within the range of the SD standard to the detachable device 100, and receives a response from the detachable device 100, thereby performing communication with the detachable device 100. The network communication unit 307 performs communication with the input/output apparatus 130 via the network 120.

(Arrangement of Detachable Device)

Figure 4:
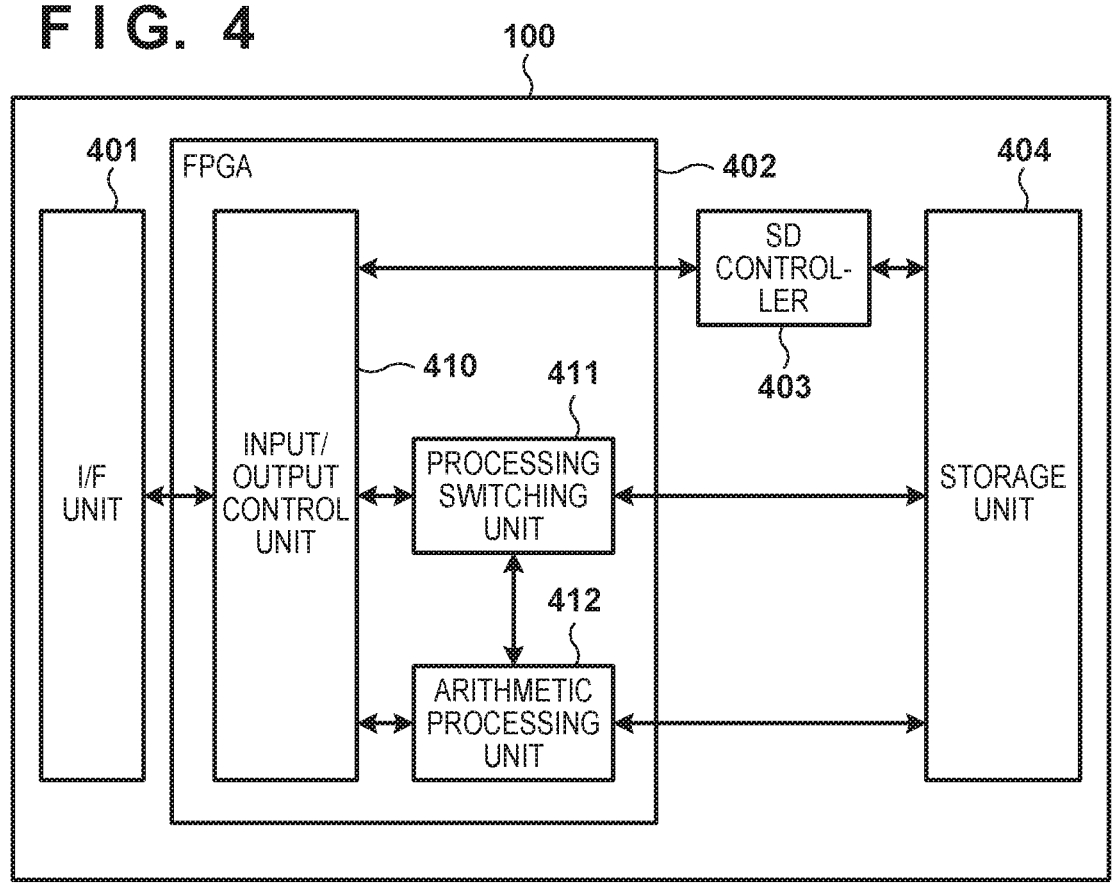
FIG. 4 is a block diagram showing an example of the hardware arrangement of a detachable device.

FIG. 4 is a block diagram showing an example of the hardware arrangement of the detachable device 100. As an example, the detachable device 100 is configured to include an I/F unit 401, an FPGA 402, and an SD controller 403. The detachable device 100 is formed into a shape that can be inserted/removed into/from the attaching/detaching socket of the SD I/F unit 205 provided in the image capturing apparatus 110, that is, a shape complying with the SD standard.

The I/F unit 401 is an interface portion used to connect an apparatus such as the image capturing apparatus 110 and the detachable device 100. The I/F unit 401 is configured to include, for example, an electrical contact terminal that receives supply of power from the image capturing apparatus 110 and generates and distributes a power supply to be used in the detachable device 100, and the like. Concerning items defined in (complying with) the SD standard, the I/F unit 401 complies with that, like the SD I/F unit 205 of the image capturing apparatus 110. Reception of images and setting data from the image capturing apparatus 110 and transmission of data from the FPGA 402 to the image capturing apparatus 110 are executed via the I/F unit 401.

The FPGA 402 is configured to include an input/output control unit 410, a processing switching unit 411, and an arithmetic processing unit 412. The FPGA 402 is a kind of semiconductor device capable of repetitively reconstructing an internal logic circuit structure. By processing implemented by the FPGA 402, a processing function can be added (provided) to the apparatus in which the detachable device 100 is mounted. Additionally, since the logic circuit structure can be changed later by the reconstruction function of the FPGA 402, when the detachable device 100 is mounted in, for example, an apparatus in a field of a quickly advancing technology, appropriate processing can be executed in the apparatus at an appropriate timing. Note that in this embodiment, an example in which an FPGA is used will be described. However, for example, a general-purpose ASIC or a dedicated LSI may be used if processing to be described later can be executed. The FPGA 402 is activated by writing, from a dedicated I/F, setting data including the information of a logic circuit structure to be generated or reading out the setting data from the dedicated I/F. In this embodiment, the setting data is held in the storage unit 404. When powered on, the FPGA 402 reads out the setting data from the storage unit 404 and generates and activates a logic circuit. However, the present invention is not limited to this. For example, the image capturing apparatus 110 may write the setting data in the FPGA 402 via the I/F unit 401 by implementing a dedicated circuit in the detachable device.

The input/output control unit 410 is configured to include a circuit used to transmit/receive an image to/from the image capturing apparatus 110, a circuit that analyzes a command received from the image capturing apparatus 110, a circuit that controls based on a result of analysis, and the like. Commands here are defined by the SD standard, and the input/output control unit 410 can detect some of them. Details of the functions will be described later. The input/output control unit 410 controls to transmit an image to the SD controller 403 in storage processing and transmit an image to the arithmetic processing unit 412 in image analysis processing. If the setting data of switching of processing is received, the input/output control unit 410 transmits the setting data to the processing switching unit 411. The processing switching unit 411 is configured to include a circuit configured to obtain the information of the image analysis processing function from the storage unit 404 based on the setting data received from the image capturing apparatus 110 and write the information in the arithmetic processing unit 412. The information of the image analysis processing function includes setting parameters representing, for example, the order and types of operations processed in the arithmetic processing unit 412, the coefficients of operations, and the like. The arithmetic processing unit 412 is configured to include a plurality of arithmetic circuits needed to execute the image analysis processing function. The arithmetic processing unit 412 executes each arithmetic processing based on the information of the image analysis processing function received from the processing switching unit 411, transmits the processing result to the image capturing apparatus 110, and/or records the processing result in the storage unit 404. As described above, the FPGA 402 extracts the setting data of an execution target processing function included in setting data corresponding to a plurality of processing functions held in advance, and rewrites processing contents to be executed by the arithmetic processing unit 412 based on the extracted setting data. This allows the detachable device 100 to selectively execute at least one of the plurality of processing functions. In addition, by appropriately adding setting data of processing to be newly added, latest processing can be executed on the side of the image capturing apparatus 110. Note that holding a plurality of setting data corresponding to a plurality of processing functions will be referred to as holding a plurality of processing functions hereinafter. That is, even in a state in which the FPGA 402 of the detachable device 100 is configured to execute one processing function, if the processing contents of the arithmetic processing unit 412 can be changed by setting data for another processing function, this will be expressed as holding a plurality of processing functions.

The SD controller 403 is a known control IC (Integrated Circuit) as defined by the SD standard, and executes control of a slave operation of an SD protocol and control of data read/write for the storage unit 404. The storage unit 404 is formed by, for example, a NAND flash memory, and stores various kinds of information such as storage data written from the image capturing apparatus 110, the information of the image analysis processing function written in the arithmetic processing unit 412, and setting data of the FPGA 402.

Figure 5:
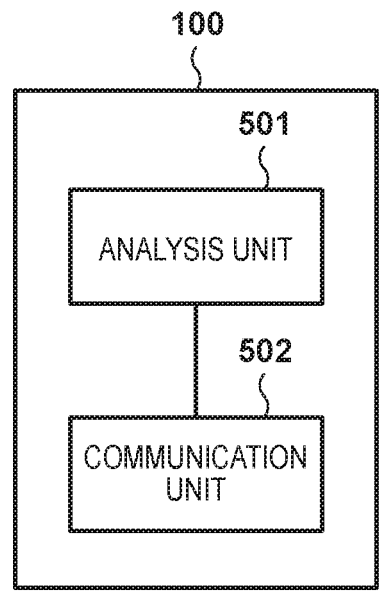
FIG. 5 is a block diagram showing an example of the functional arrangement of the detachable device.

FIG. 5 shows an example of the functional arrangement of the detachable device 100. The detachable device 100 includes, as its functional arrangement, for example, an analysis unit 501 and a communication unit 502. The analysis unit 501 executes analysis processing for an image. For example, if an analysis processing setting request is input, the analysis unit 501 executes setting to set the input analysis processing in an executable state. If an image is input, the analysis unit 501 executes the analysis processing set in the executable state for the input image. In this embodiment, executable analysis processing includes human body detection processing and face detection processing but is not limited to these. For example, it may be processing (face authentication processing) of determining whether a person stored in advance is included in an image. For example, if the degree of matching between the image characteristic amount of a person stored in advance and the image characteristic amount of a person detected from an input image is calculated, and the degree of matching is equal to or larger than a threshold, it is determined that the person is the person stored in advance. Alternatively, it may be processing of superimposing a predetermined mask image or performing mosaic processing on a person detected from an input image for the purpose of privacy protection. It may be processing of detecting, using a learning model that has learned a specific action of a person by machine learning, whether a person in an image is taking the specific action. Furthermore, it may be processing of determining what kind of region a region in an image is. It may be processing of determining, using, for example, a learning model that has learned buildings, roads, persons, sky and the like by machine learning, what kind of region a region in an image is. As described above, executable analysis processing can be applied to both image analysis processing using machine learning and image analysis processing without using machine learning. Each analysis processing described above may be executed not independently by the detachable device 100 but in cooperation with the image capturing apparatus 110. The communication unit 502 performs communication with the image capturing apparatus 110 via the I/F unit 401.

(Arrangement of Input/Output Apparatus)

Figure 6:
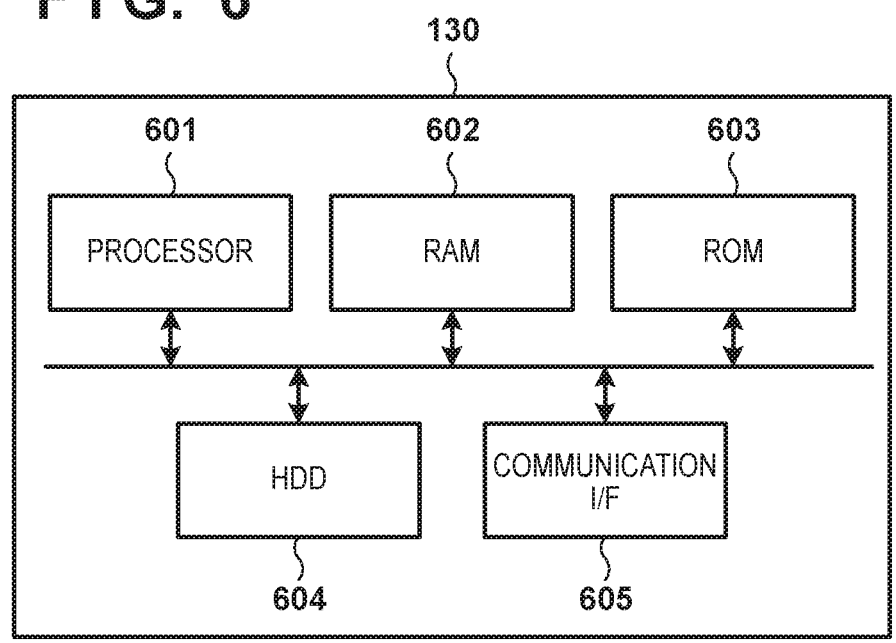
FIG. 6 is a block diagram showing an example of the hardware arrangement of an input/output apparatus.

FIG. 6 shows an example of the hardware arrangement of the input/output apparatus 130. The input/output apparatus 130 is formed as a computer such as a general PC, and is configured to include, for example, a processor 601 such as a CPU, memories such as a RAM 602 and a ROM 603, a storage device such as an HDD 604, and a communication I/F 605, as shown in FIG. 6. The input/output apparatus 130 can execute various kinds of functions by executing, by the processor 601, programs stored in the memories and the storage device.

Figure 7:
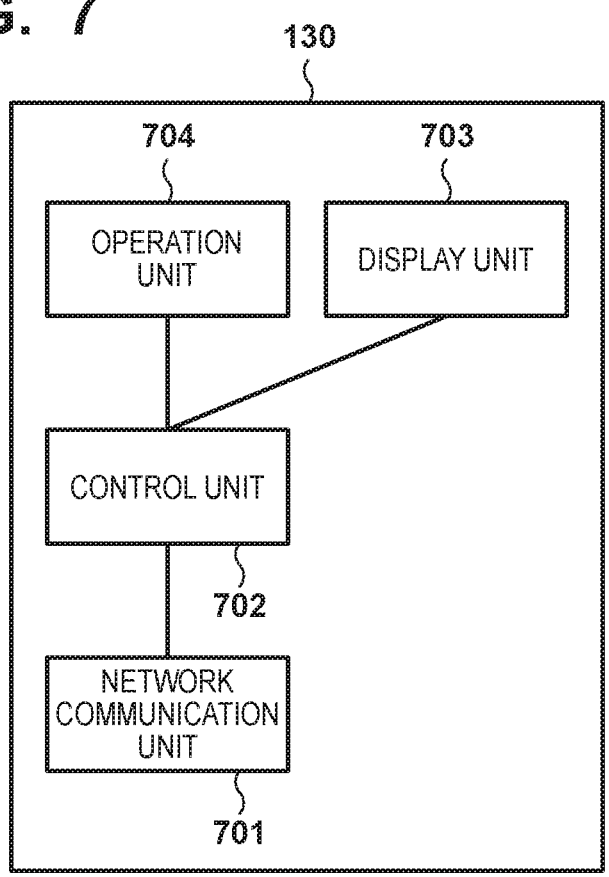
FIG. 7 is a block diagram showing an example of the functional arrangement of the input/output apparatus.

FIG. 7 shows an example of the functional arrangement of the input/output apparatus 130 according to this embodiment. The input/output apparatus 130 includes, as its functional arrangement, for example, a network communication unit 701, a control unit 702, a display unit 703, and an operation unit 704. The network communication unit 701 is connected to, for example, the network 120 and executes communication with an external apparatus such as the image capturing apparatus 110 via the network 120. Note that this is merely an example and, for example, the network communication unit 701 may be configured to establish direct communication with the image capturing apparatus 110 and communicate with the image capturing apparatus 110 without intervention of the network 120 or other apparatus. The control unit 702 controls such that the network communication unit 701, the display unit 703, and the operation unit 704 execute processing of their own. The display unit 703 presents information to the user via, for example, a display. In this embodiment, a result of rendering by a browser is displayed on a display, thereby presenting information to the user. Note that information may be presented by a method such as a voice or a vibration other than screen display. The operation unit 704 accepts an operation from the user. In this embodiment, the operation unit 704 is a mouse or a keyboard, and the user operates these to input a user operation to the browser. However, the operation unit 704 is not limited to this and may be, for example, another arbitrary device capable of detecting a user's intention, such as a touch panel or a microphone.

<Procedure of Processing>

An example of the procedure of processing executed in the system will be described next. Note that processing executed by the image capturing apparatus 110 in the following processes is implemented by, for example, by a processor in the arithmetic processing unit 203, executing a program stored in a memory or the like. However, this is merely an example, and processing to be described later may partially or wholly be implemented by dedicated hardware. In addition, processing executed by the detachable device 100 or the input/output apparatus 130 may also be implemented by, by a processor in each apparatus, executing a program stored in a memory or the like, and processing may partially or wholly be implemented by dedicated hardware.

(Overall Procedure)

Figure 8:
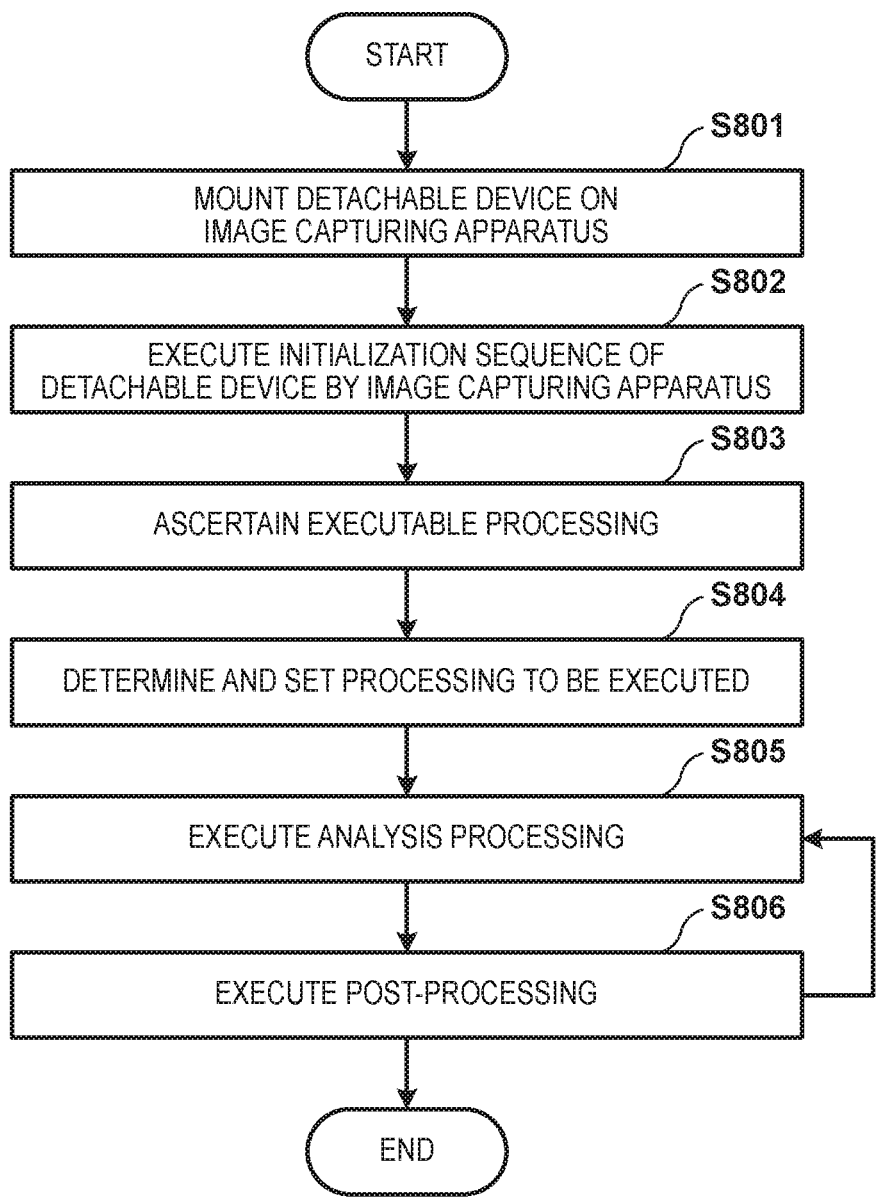
FIG. 8 is a flowchart showing an example of the procedure of processing executed by the system.

FIG. 8 schematically shows a series of procedures of image analysis processing executed by the system. In this processing, first, the user mounts the detachable device 100 in the image capturing apparatus 110 (step S801). The image capturing apparatus 110 executes an initialization sequence of the detachable device 100 (step S802). In this initialization sequence, predetermined commands are transmitted/received between the image capturing apparatus 110 and the detachable device 100, and the image capturing apparatus 110 is thus set in a state in which it can use the detachable device 100. After that, the image capturing apparatus 110 ascertains processing executable by the detachable device 100, and ascertains processing that can be executed locally (that can be executed only by the image capturing apparatus 110 or by the combination of the image capturing apparatus 110 and the detachable device 100) (step S803). Note that although the detachable device 100 can be configured to execute arbitrary processing, processing irrelevant to processing that should be executed on the side of the image capturing apparatus 110 need not be taken into consideration. In an example, the image capturing apparatus 110 may hold a list of executable processes, which is obtained in advance from, for example, the input/output apparatus 130. In this case, when obtaining, from the detachable device 100, information representing processing executable by the detachable device 100, the image capturing apparatus 110 can ascertain only the executable processing depending on whether the processing is included in the list. Next, the image capturing apparatus 110 determines processing to be executed, and executes setting of the detachable device 100 as needed (step S804). That is, if at least part of processing determined as an execution target is to be executed by the detachable device 100, setting of the detachable device 100 for the processing is executed. In this setting, for example, reconstruction of the FPGA 402 using setting data corresponding to the processing of the execution target can be performed. Then, the image capturing apparatus 110 or the detachable device 100 executes analysis processing (step S805). After that, the image capturing apparatus 110 executes post-processing (step S806). Note that the processes of steps S805 and S806 are repetitively executed. The processing shown in FIG. 8 is executed when, for example, the detachable device 100 is mounted. However, at least part of the processing shown in FIG. 8 may repetitively be executed such that, for example, the process of step S803 is executed again when the detachable device 100 is detached.

(Processing of Ascertaining Executable Processing)

Figure 9:
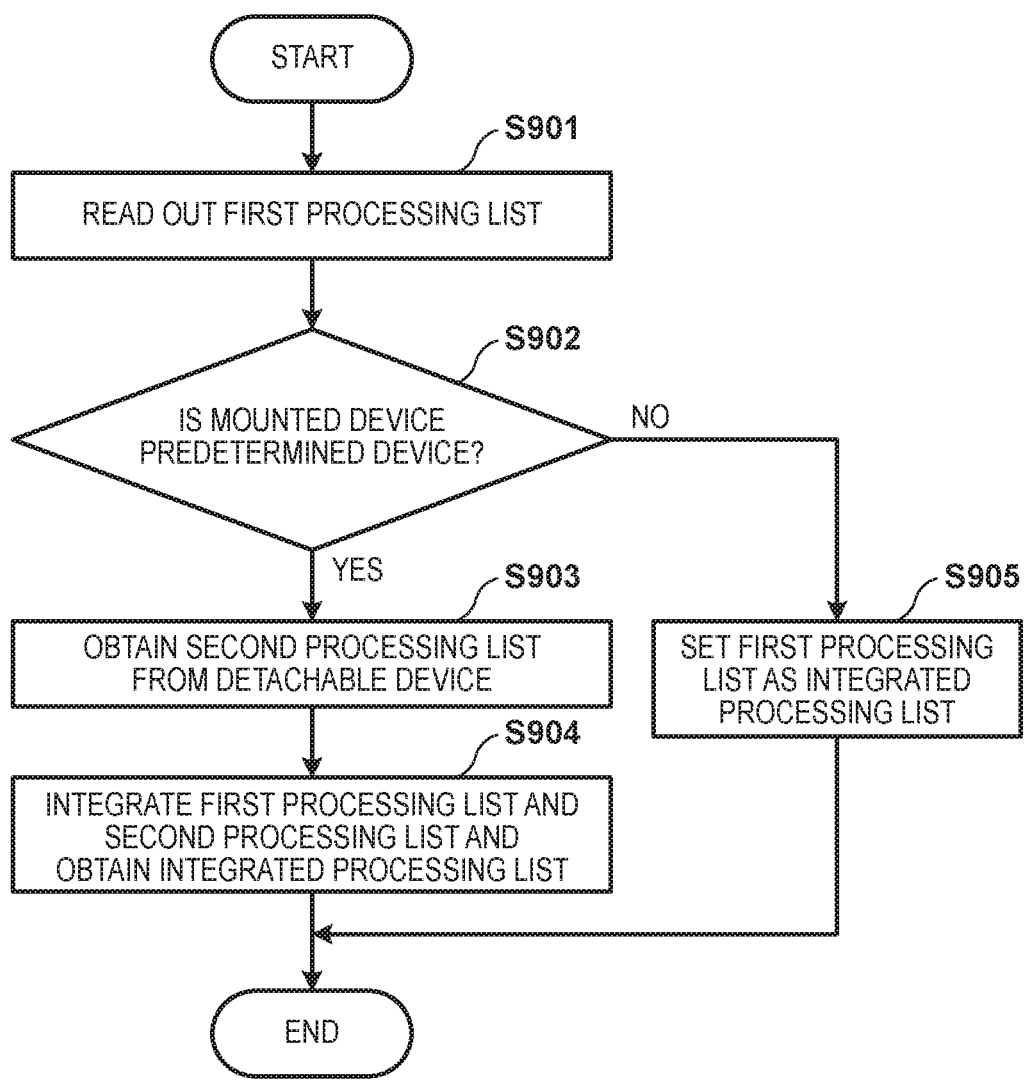
FIG. 9 is a flowchart showing an example of the procedure of processing of ascertaining analysis processing.

FIG. 9 shows an example of the procedure of processing of ascertaining processing executable by the image capturing apparatus 110. This processing corresponds to the process of step S803 in FIG. 8, and can be executed if a device such as the detachable device 100 is mounted on the image capturing apparatus 110 or removed, or if the image capturing apparatus 110 is powered on. In this processing, the image capturing apparatus 110 reads out processing executable by the detachable device 100, integrates it with analysis processing executable by the image capturing apparatus 110 itself, and ascertains analysis processing executable on the side of the image capturing apparatus 110.

First, the control unit 304 of the image capturing apparatus 110 reads out a first processing list that is a list of processes executable by the analysis unit 305 of the image capturing apparatus 110 itself, which is stored in the storage unit 303 (step S901). Next, the control unit 304 determines whether the mounted device is, for example, a conventional device having only a storage function of a predetermined device such as the detachable device 100 having a specific processing function (step S902). For example, the control unit 304 controls the device communication unit 306 to issue a read request (read command) for a specific address to the mounted device and read out flag data stored at the specific address. The specific address will sometimes be referred to as "address A" hereinafter. Note that details of the data stored at the address A will be described later. The control unit 304 can determine, based on the read flag data, whether the detachable device 100 is a predetermined device having a specific processing function. However, this is merely an example, and it may be determined by another method whether the mounted device is a predetermined device.

If the mounted device is a predetermined device (YES in step S902), the control unit 304 executes processing of ascertaining processing executable in the device (detachable device 100). The control unit 304 controls the device communication unit 306 to communicate with detachable device 100 and obtain a list (to be referred to as a "second processing list" hereinafter) of processes executable in the detachable device 100 (step S903). The control unit 304 reads out the data stored at the address A as in a case in which, for example, it is determined whether the detachable device 100 is a predetermined device, thereby obtaining the second processing list. Note that, for example, the second processing list can be stored at the same address (address A) as the flag data used to determine whether the detachable device is a predetermined device. In this case, the image capturing apparatus 110 can simultaneously execute the process of step S902 and the process of step S903 by accessing the address A and simultaneously obtaining the flag data and the second processing list. However, the present invention is not limited to this, and these data may be stored at different addresses. After that, the control unit 304 creates an integrated processing list in which the first processing list of processes executable by the image capturing apparatus 110 itself, which is read out from the storage unit 303, and the second processing list obtained from the detachable device are integrated (step S904), and ends the processing.

The integrated processing list represents a list of processes locally executable on the side of the image capturing apparatus 110 without performing processing by an apparatus such as a server apparatus on the network. Note that in this embodiment, the integrated processing list is a list obtained by the union of the processes included in the first processing list and the processes included in the second processing list. The integrated processing list is the list of processes included in at least one of the first processing list and the second processing list. However, the present invention is not limited to this. For example, if another processing can be executed by combining a process included in the first processing list and a process included in the second processing list, the other executable processing may be added to the integrated processing list. That is, if new analysis processing can be executed using at least some of the processes included in the first processing list and at least some of the processes included in the second processing list together, the information of the analysis processing can be included in the integrated processing list. For example, face authentication processing can be implemented by a function group of a face detection processing function, a face characteristic extraction processing function, and a face characteristic collation processing function. At this time, if the face detection processing function and the face characteristic extraction processing function are included in the first processing list, and the face characteristic collation processing function is included in the second processing list, the face authentication processing can be included in the integrated processing list.

If the mounted device is not a predetermined device (NO in step S902), the control unit 304 determines that there is no processing executable by the mounted device. Hence, the control unit 304 sets the first processing list of processes executable by the self-apparatus, which is read out from the storage unit 303, as the integrated processing list representing processes locally executable on the side of the image capturing apparatus 110 (step S905), and ends the processing. Note that when the processing shown in FIG. 9 is executed at the time of device removal, the predetermined device is not mounted, as a matter of course, and therefore, the first processing list is handled as the integrated processing list.

This makes it possible to form a list of processes locally executable on the side of the image capturing apparatus 110 based on whether the detachable device 100 capable of executing specific processing is mounted in the image capturing apparatus 110. In addition, when the integrated processing list is presented to the user, as will be described later, the user can select processing that becomes locally executable on the side of the image capturing apparatus 110 by the mounting of the detachable device 100.

Note that in this embodiment, an example in which the integrated processing list is generated has been described. However, the first processing list and the second processing list may separately be managed, and the integrated processing list may not be generated. That is, processes executable by the detachable device 100 and processes executable by the image capturing apparatus 110 without the detachable device 100 may be managed in a distinguishable manner and output. Even if the first processing list and the second processing list are managed in a distinguishable manner, the integrated processing list may be generated and managed. For example, if new processing can be executed using a process included in the first processing list and a process included in the second processing list together, the new processing is included not in the first processing list and the second processing list but in the integrated processing list. Note that when the integrated processing list is output, information representing whether a process included in the integrated processing list is included in the first processing list or the second processing list in a distinguishable manner can be output together. This allows the user to recognize, for example, whether presented processing can be executed without the detachable device 100.

Note that the above-described processing list is provided to an external apparatus that is not included at least in the image capturing apparatus 110, like the input/output apparatus 130, but may not be provided to the outside. For example, the processing list may be output by displaying it on a display if the image capturing apparatus 110 includes a display or by outputting the processing list by a voice if the image capturing apparatus 110 has a voice output function. If the detachable device 100 having an unintended function is erroneously mounted in the image capturing apparatus 110, the user can quickly recognize the mounting error by presenting the processing list on the image capturing apparatus 110. As described above, the image capturing apparatus 110 can output, in an arbitrary format, information based on the first processing list representing processes executable by the image capturing apparatus 110 and the second processing list representing processes executable by the detachable device 100.

Additionally, when the detachable device 100 is removed, the image capturing apparatus 110 executes the processing shown in FIG. 9 again, thereby updating the integrated processing list. At this time, the image capturing apparatus 110 can discard the second processing list concerning the removed detachable device 100. However, the present invention is not limited to this, and the image capturing apparatus 110 may separately store the second processing list concerning a certain detachable device 100 in the storage unit 303 and output the second processing list even in a case in which the detachable device 100 is not mounted. That is, the image capturing apparatus 110 may output the second processing list for the detachable device 100 mounted and removed in the past. The image capturing apparatus 110 may output information representing processing executable using a process included in the second processing list concerning the detachable device 100 mounted and removed in the past and a process included in the first processing list (executable by the self-apparatus). In other words, the image capturing apparatus 110 can output information of processing that cannot be executed only by the self-apparatus. This makes it possible to notify the user that the detachable device 100 capable of executing processing represented by output information exists, and that the processing can be executed by mounting the detachable device 100.

Furthermore, the image capturing apparatus 110 may output the second processing list concerning the detachable device 100 (non-mounted device) that has never been mounted in the self-apparatus in the past but can be mounted in the self-apparatus. Information representing such a non-mounted device and analysis processing executable by the non-mounted device can be, for example, obtained by the image capturing apparatus 110 via an external server (not shown). The information representing the non-mounted device and analysis processing executable by the non-mounted device may be, for example, held by the image capturing apparatus 110 in advance.

In addition, the image capturing apparatus 110 may output information representing a processing executable using a process included in the second processing list for the non-mounted device and a process included in the first processing list (executable by the self-apparatus). In other words, the image capturing apparatus 110 can output information of processing that cannot be executed only by the self-apparatus. This makes it possible to notify the user that the detachable device 100 capable of executing processing represented by output information exists, and that the processing can be executed by mounting the detachable device 100.

Note that when storing the second processing list for the detachable device 100 mounted and removed in the past, the image capturing apparatus 110 can store information capable of identifying the device, such as the model number of the detachable device 100, together. When outputting the second processing list concerning the detachable device 100, the image capturing apparatus 110 can output the information capable of identifying the detachable device 100 together. This allows the user to easily recognize which detachable device 100 should be mounted in the image capturing apparatus 110 to use a presented processing function.

(Processing of Determining Analysis Processing Contents)

Figure 10:
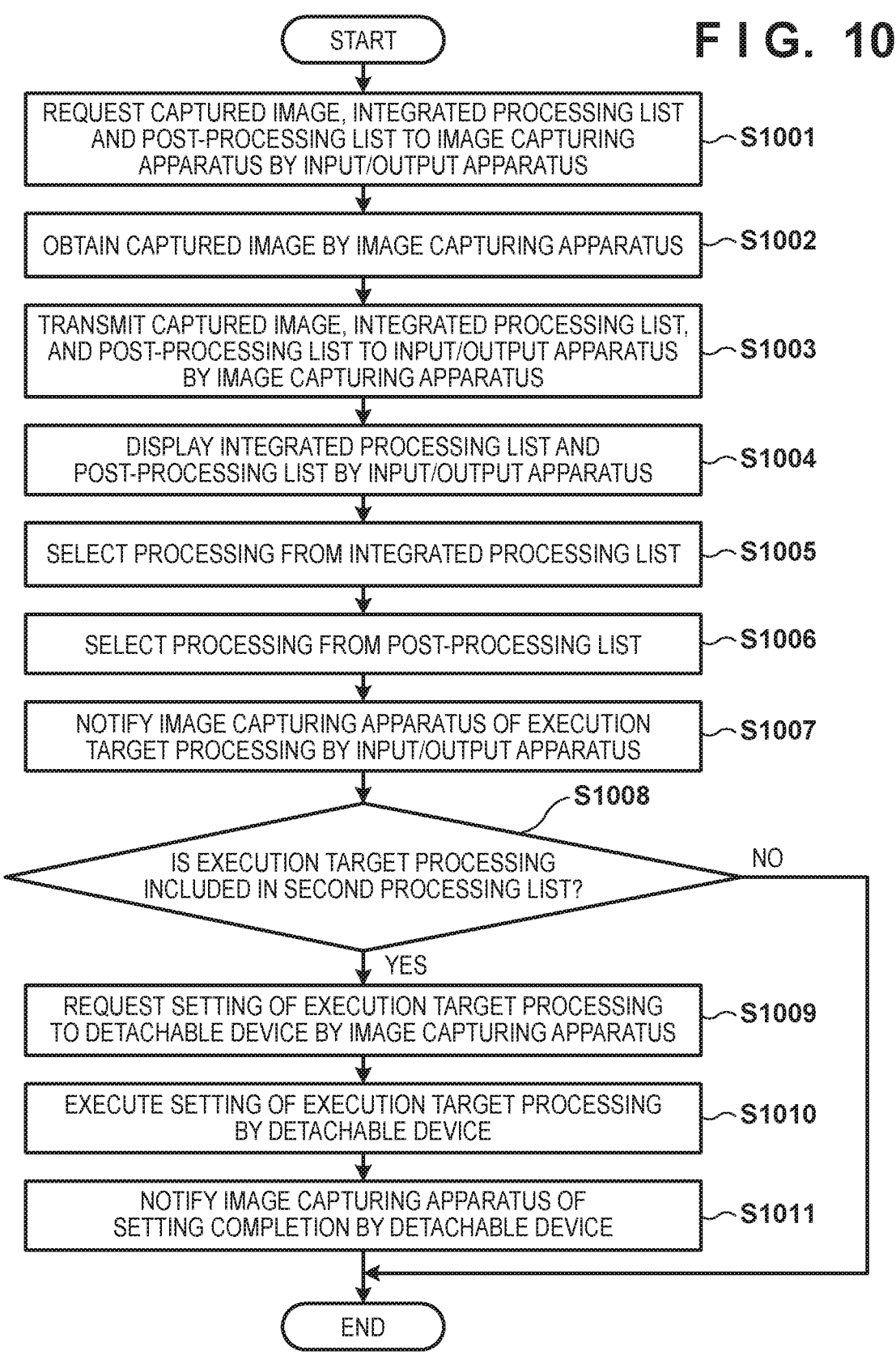
FIG. 10 is a flowchart showing an example of the procedure of processing of determining the contents of analysis processing.

FIG. 10 shows an example of the procedure of processing of determining analysis processing contents by the image capturing apparatus 110. In this processing, analysis processing locally executable on the side of the image capturing apparatus 110 is presented to the user via the input/output apparatus 130, and the input/output apparatus 130 accepts selection of the user. The image capturing apparatus 110 determines analysis processing to be executed in accordance with information representing the user selection accepted via the input/output apparatus 130.

In this processing, first, the control unit 702 of the input/output apparatus 130 controls the network communication unit 701 to execute communication with the image capturing apparatus 110 and request obtaining of a captured image, an integrated processing list, and a post-processing list (step S1001). As an example, the input/output apparatus 130 transmits a request message defined by the ONVIF standard to the image capturing apparatus 110, thereby requesting transmission of information to the image capturing apparatus 110. However, the present invention is not limited to this, and the information transmission request may be done by another message or the like. In the image capturing apparatus 110, the network communication unit 307 receives the request and outputs it to the control unit 304. The control unit 304 executes control based on the request such that the image capturing control unit 301 captures the peripheral environment, and the signal processing unit 302 processes an image captured by the image capturing control unit 301 to obtain a captured image (step S1002). The obtained captured image is output to the control unit 304. Note that the image capturing apparatus 110 may capture the peripheral environment independently of the presence/absence of the request and continuously obtain a captured image. The image capturing apparatus 110 may locally store the captured image or transfer the captured image to another apparatus such as a network server and store. The control unit 304 reads out a post-processing list stored in the storage unit 303. In this embodiment, the post-processing list includes display processing and storage processing but is not limited to this. The control unit 304 transmits, via the network communication unit 307, the post-processing list, an integrated processing list obtained by the processing shown in FIG. 9, and the captured image obtained in step S1002 to the input/output apparatus 130 (step S1003). As an example, the image capturing apparatus 110 transmits a response message to the request message defined by the above-described ONVIF standard to the input/output apparatus 130, thereby transmitting the information to the input/output apparatus 130. However, the present invention is not limited to this, and the information may be transmitted by another message or the like. Note that only processing to be executed may be taken into consideration here, and the captured image request by the input/output apparatus 130 in step S1001, the captured image obtaining in step S1002, and captured image transmission to the input/output apparatus 130 in step S1003 may not be performed.

The control unit 702 of the input/output apparatus 130 controls the network communication unit 701 to receive the captured image, the integrated processing list, and the post-processing list from the image capturing apparatus 110. The control unit 702 then controls the display unit 703 to present the integrated processing list and the post-processing list to the user by screen display or the like (step S1004). Note that at this time, the control unit 702 may also present the captured image to the user by screen display or the like. After that, the user confirms the integrated processing list and the post-processing list displayed by the display unit 703, and selects analysis processing to be executed (to be referred to as "execution target processing" hereinafter) from the integrated processing list via the operation unit 704 (step S1005). In addition, the user selects a post-processing to be executed (to be referred to as "execution target post-processing" hereinafter) via the operation unit 704 (step S1006). Details of information presentation to the user in step S1004, analysis processing selection by the user in step S1005, and post-processing selection by the user in step S1006 will be described later. The operation unit 704 outputs the selection results of the execution target processing and the execution target post-processing to the control unit 702. The control unit 702 controls the network communication unit 701 to transmit information representing the execution target processing and the execution target post-processing input from the operation unit 704 to the image capturing apparatus 110 (step S1007).

The control unit 304 of the image capturing apparatus 110 controls the network communication unit 307 to receive the information representing the execution target processing selected by the user from the input/output apparatus 130 and determine whether the execution target processing is processing included in the second processing list (step S1008). If the execution target processing is not included in the second processing list (NO in step S1008), the control unit 304 ends the processing shown in FIG. 10 without making a notification to the detachable device 100 to execute the processing in the image capturing apparatus 110. On the other hand, if the execution target processing is included in the second processing list (YES in step S1008), the control unit 304 controls the device communication unit 306 to transmit an execution target processing setting request to the detachable device 100 (step S1009).

The communication unit 502 of the detachable device 100 receives the execution target processing setting request from the image capturing apparatus 110. At this time, the communication unit 502 can discriminate the execution target processing setting request by the amount of data written from the image capturing apparatus 110 or the type of a write command. Details of the setting request discrimination method will be described later. The communication unit 502 outputs the execution target processing setting request received from the image capturing apparatus 110 to the analysis unit 501. Based on the execution target processing setting request input from the communication unit 502, the analysis unit 501 executes setting to set the detachable device 100 in a state in which the execution target processing can be executed (step S1010). For example, after the completion of the setting processing, the communication unit 502 transmits a setting completion notification to the image capturing apparatus 110 (step S1011). Note that the communication unit 502 need only notify information for inhibiting the image capturing apparatus 110 from writing data at a timing at which the setting of the detachable device 100 is not completed yet, and may notify the image capturing apparatus 110 of the information of the setting completion timing or the like before the setting is actually completed. The control unit 304 of the image capturing apparatus 110 controls the device communication unit 306 to receive the setting completion notification from the detachable device 100.

The setting completion notification from the detachable device 100 to the image capturing apparatus 110 can be executed using, for example, one of the following three methods. In the first notification method, the communication unit 502 outputs a BUSY signal in a case in which the setting of the execution target processing has not ended at the time of write processing of the data of the first block from the image capturing apparatus 110. Output of the BUSY signal is performed by, for example, driving a signal line of DATA defined by the SD standard to a Low state. In this case, the image capturing apparatus 110 confirms the BUSY signal, thereby discriminating whether the setting of the execution target processing is completed. In the second notification method, the time until setting of the execution target processing is completed is stored in advance at the above-described specific address, and the image capturing apparatus 110 reads out the information of the time until the setting completion. After the elapse of the time until the execution target processing setting completion, the image capturing apparatus 110 outputs write data (issues a write command).

This allows the image capturing apparatus 110 to transmit the data of the captured image after the setting of the execution target processing is completed. In the third notification method, when the setting of the execution target processing is completed, the analysis unit 501 writes a setting completion flag at a second specific address of the detachable device 100. The image capturing apparatus 110 reads out the data at the second specific address, thereby discriminating whether the setting of the execution target processing is completed. Note that the information of the address at which the setting completion flag is written may be stored at the above-described specific address or may be stored at another address.

As in the processing shown in FIG. 10, when the integrated processing list determined depending on whether the detachable device 100 capable of executing specific processing is mounted in the image capturing apparatus 110 is used, the execution target processing can appropriately be determined in consideration of the state on the side of the image capturing apparatus 110. If the execution target processing includes a process to be executed by the detachable device 100, setting of the detachable device 100 is automatically performed, thereby preparing for executing the processing selected by the user without performing a setting operation by the user. If the execution target processing does not include a process to be executed by the detachable device 100, setting of the detachable device 100 is not performed, thereby preventing setting of the detachable device 100 for being unnecessarily performed in a case in which the processing is to be executed only by the image capturing apparatus 110.

(Execution Control of Analysis Processing)

Figure 11:
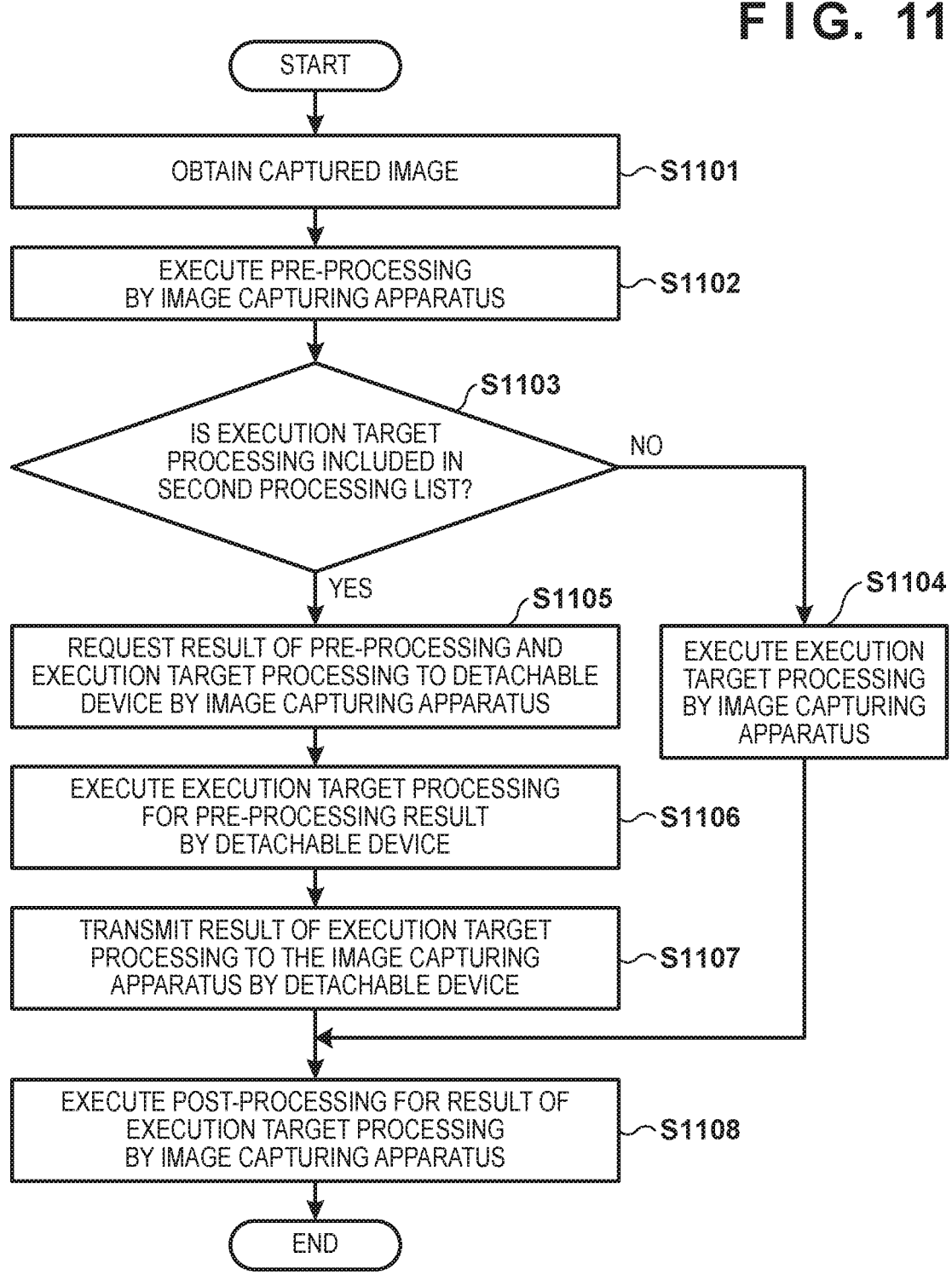
FIG. 11 is a flowchart showing an example of the procedure of control of executing analysis processing.

FIG. 11 shows an example of the procedure of control when the image capturing apparatus 110 executes analysis processing. In this processing, first, the image capturing control unit 301 captures the peripheral environment (step S1101). The control unit 304 controls the signal processing unit 302 to process an image captured by the image capturing control unit 301 and obtain a captured image. After that, the control unit 304 controls the analysis unit 305 to execute pre-analysis processing for the captured image input from the control unit 304 and obtain the image of the pre-analysis processing result (step S1102). The control unit 304 determines whether the execution target processing is included in the second processing list (step S1103).

Upon determining that the execution target processing is not included in the second processing list (NO in step S1103), the control unit 304 controls the analysis unit 305 to execute the execution target processing for the image of the pre-analysis processing result in the image capturing apparatus 110 (step S1104). The control unit 304 controls the analysis unit 305 to execute post-analysis processing for the analysis processing result (step S1108), and ends the processing.

If the execution target processing is included in the second processing list (YES in step S1103), the control unit 304 controls the device communication unit 306 to transmit the image of the pre-analysis processing result to the detachable device 100 (step S1105). For example, the control unit 304 issues a write request (write command) of the pre-analysis processing result, thereby transmitting the image of the pre-analysis processing result to the detachable device 100. The communication unit 502 of the detachable device 100 receives the image of the pre-analysis processing result from the image capturing apparatus 110, and outputs the image received from the image capturing apparatus 110 to the analysis unit 501. The analysis unit 501 executes the execution target processing set in step S1010 of FIG. 10 for the image input from the communication unit 502 (step S1106). Then, the communication unit 502 transmits the analysis processing result obtained by the processing of the analysis unit 501 to the image capturing apparatus 110 (step S1107). The control unit 304 of the image capturing apparatus 110 controls the device communication unit 306 to receive the analysis processing result from the detachable device 100. After that, the control unit 304 controls the analysis unit 305 to execute post-analysis processing for the analysis processing result (step S1108).

Transmission of the analysis processing result from the detachable device 100 to the image capturing apparatus 110 is done, for example, in the following way. The analysis unit 501 of the detachable device 100 stores the analysis processing result at the storage destination address for the analysis processing result, which is assigned for each execution target processing. The image capturing apparatus 110 reads out information representing the storage address of the analysis processing result, which is stored at the address A together with, for example, the second processing list, and issues a read request (read command) for the storage address. The detachable device 100 receives the read request for the storage address of the analysis processing result via the communication unit 502, and outputs the analysis processing result to the image capturing apparatus 110. Note that the image capturing apparatus 110 can issue the read request for the storage address of the analysis processing result, for example, after the elapse of an estimated processing time stored at the address A. In addition, the detachable device 100 may output a BUSY signal from the write request of the last block of the pre-analysis processing result transmitted from the image capturing apparatus 110 to the end of the execution target processing. In this case, the image capturing apparatus 110 can issue the read request for the storage address of the analysis processing result when the BUSY signal is not received any more. This allows the image capturing apparatus 110 to obtain the processing result after the end of the processing.

With the above-described processing, the image capturing apparatus 110 can determine, in accordance with the selected execution target processing, whether to transfer the captured image to the detachable device 100. It is therefore possible to execute analysis processing of the captured image while the user is not conscious of which one of the image capturing apparatus 110 or the detachable device 100 should execute analysis processing.

(Execution Control of Post-Processing)

FIG. 12 shows an example of the procedure of control when the image capturing apparatus 110 executes post-processing. In this processing, the control unit 304 of the image capturing apparatus 110 determines whether "display" is included in the execution target post-processing (step S1201). Upon determining that display is included in the execution target post-processing (YES in step S1201), the control unit 304 controls the network communication unit 307 to transmit the result of analysis processing to the input/output apparatus 130 (step S1202). The control unit 702 of the input/output apparatus 130 controls the network communication unit 701 to receive the result of analysis processing from the image capturing apparatus 110, and then controls the display unit 703 to present the result of analysis processing to the user by screen display or the like (step S1203). On the other hand, if the control unit 304 determines that display is not included in the execution target post-processing (NO in step S1201), the processes of steps S1202 and S1203 are not executed.

In addition, the control unit 304 of the image capturing apparatus 110 determines whether "storage" is included in the execution target post-processing (step S1204). Note that the determination of step S1204 may be executed before step S1201 or may be executed in parallel to the step S1201. Upon determining that storage is included in the execution target post-processing (YES in step S1204), the control unit 304 controls the storage unit 303 to store the result of analysis processing and ends the processing. On the other hand, upon determining that storage is not included in the execution target post-processing (NO in step S1204), the control unit 304 ends the processing without executing the process of step S1205.

As described above, in accordance with the selected post-processing, the image capturing apparatus 110 can execute transfer of the result of analysis processing to the input/output apparatus 130 or storage in the storage unit 303 without accepting a special setting operation of the user and improve the convenience.

(Communication Between Image Capturing Apparatus 110 and Detachable Device 100)

Communication between the image capturing apparatus 110 and the detachable device 100 will be described here. The arithmetic processing unit 203 of the image capturing apparatus 110 and the SD controller 403 of the detachable device 100 are connected by a power supply line, a GND line, a clock line, a command line, and a data line via the device insertion socket of the SD I/F unit 205 of the image capturing apparatus 110. Note that the clock line, the command line, and the data line are connected via the FPGA 402. On the clock line, a synchronization clock output from the arithmetic processing unit 203 is communicated. On the command line, a command issued for an operation request from the arithmetic processing unit 203 to the SD controller 403 and a response to the command from the SD controller 403 to the arithmetic processing unit 203 are communicated. On the data line, write data from the arithmetic processing unit 203 and read data from the detachable device 100 are communicated. In addition, the arithmetic processing unit 203 discriminates High and Low of a device detect signal of the device insertion socket of the SD I/F unit 205, thereby recognizing whether the detachable device 100 is inserted.

The arithmetic processing unit 203 issues a command to the SD controller 403 on the command line after power supply. Upon receiving a response from the SD controller 403 and output data representing device information as an SD card, the arithmetic processing unit 203 sets a voltage for data communication, a communication speed (clock frequency), and the like.

Figure 13A:
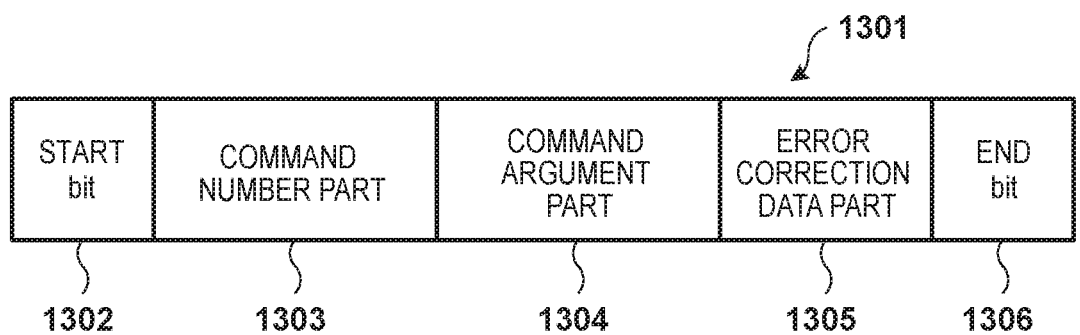
FIGS. 13A and 13B are views showing the structures of a command and a response.
Figure 13B:
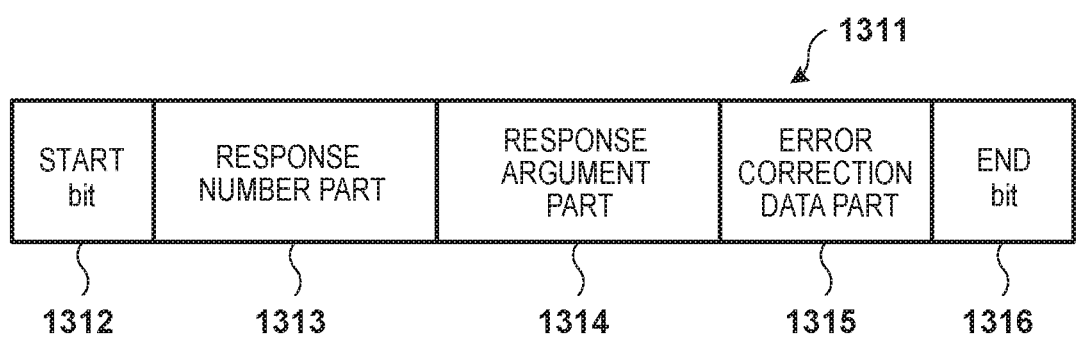

FIGS. 13A and 13B show the structures of a command and a response communicated on the command line. The command and response have structures complying with the SD standard. A command 1301 issued from the arithmetic processing unit 203 to the SD controller 403 is configured to include a command number part 1303, a command argument part 1304, and an error correction data part 1305. In the command number part 1303, a value indicating the type of the command is described. For example, if a value "23" is stored in the command number part 1303, this indicates that the command is a block count designation command for designating the number of data blocks, if a value "25" is stored in the command number part 1303, this indicates that the command is a multi-write command. If a value "12" is stored in the command number part 1303, this indicates that the command is a data transfer stop command. In the command argument part 1304, pieces of information such as the number of transfer data blocks and the write/read address of a memory are designated in accordance with the type of the command. A command start bit 1302 representing the start position of the command is added to the first bit of the command, and a command end bit 1306 representing the end of the command is added to the final bit of the command.

A response 1311 returned from the SD controller 403 in response to the command from the arithmetic processing unit 203 includes a response number part 1313 representing for which command the response is returned, a response argument part 1314, and an error correction data part 1315. A response start bit 1312 representing the start position of the response is added to the first bit of the response, and a response end bit 1316 representing the end position of the response is added to the final bit of the response. In the response argument part 1314, pieces of information such as the status of the SD card are stored in accordance with the command type.

Figure 14:
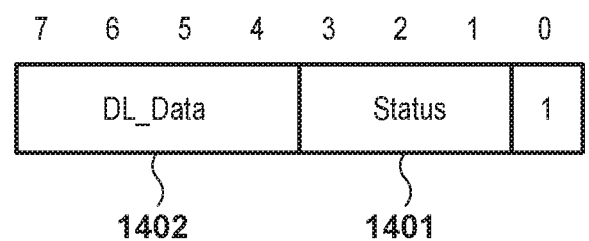
FIG. 14 is a view showing an example of the arrangement of a response argument part.

FIG. 14 shows an example of a data stream stored in the response argument part 1314 in this embodiment. The example of FIG. 14 shows a case in which an 8-bit data stream is stored in the response argument part 1314. In the 8-bit data stream, data "1" of always stored in the first bit that is the least significant bit (a bit with an index "0"), and Status 1401 representing the state of a response is stored in the second to fourth bits (bits with indices "1" to "3"). In this embodiment, the area from the fifth to eighth bits of the 8-bit data stream is configured to store DL_Data 1402 that is data representing the execution result of execution target processing from the detachable device 100.

(First Example of Transfer of Data)

An example of a method of transmitting/receiving data between the image capturing apparatus 110 and the detachable device 100 will be described next. Transmission/reception of data between the image capturing apparatus 110 and the detachable device 100 is executed by write and read of data according to a protocol of the SD standard in the SD I/F unit 205 of the image capturing apparatus 110 and the I/F unit 401 of the detachable device 100. FIGS. 15 and 16 show an example of the procedure of processing of writing input data in the detachable device 100 by the image capturing apparatus 110 and reading the processing result after execution target processing is executed for the input data. In the protocol of the SD standard, a command line used to transmit a command and a data line used to transmit data are separately prepared.

The example shown in FIG. 15 is an example in a case in which in transmission/reception of data between the image capturing apparatus 110 and the detachable device 100, the data of the result of processing by the detachable device 100 is returned as read data. In the example shown in FIG. 15, the image capturing apparatus 110 transmits, on the command line, a write command W1_Com 1501 to the detachable device 100 to write data, and receives, from the detachable device 100, W1_Res 1502 that is a response to the command. Note that the response is transmitted such that the transmission is completed within a predetermined time after the transmission of the command. The W1_Res 1502 is transmitted from the detachable device 100 to the image capturing apparatus 110. Upon receiving the response W1_Res 1502 to the write command W1_Com 1501, the image capturing apparatus 110 transmits W1_Data 1511 that is write target data to the detachable device 100 on the data line. The data transmitted here is data as the target of image analysis processing by the detachable device 100.

After that, to read the processing result of image analysis processing, the image capturing apparatus 110 transmits a read command R1_Com 1503 to the detachable device 100 on the command line. The image capturing apparatus 110 then receives R1_Res 1504 as a response to the read command from the detachable device 100 on the command line, and receives R1_Data 1512 as read data on the data line. By the R1_Data 1512, for example, the processing result of the execution target processing executed for the W1_Data 1511 in the detachable device 100 is transmitted from the detachable device 100 to the image capturing apparatus 110. That is, in the example shown in FIG. 15, the processing result of the execution target processing in the detachable device 100 is transmitted from the detachable device 100 to the image capturing apparatus 110 as read data associated with the read command transmitted from the image capturing apparatus 110.

After that, for example, to transmit the data of the next processing target to the detachable device 100, the image capturing apparatus 110 issues a write command W2_Com 1505 on the command line. Upon receiving a response W2_Res 1506 from the detachable device 100 on the command line, the image capturing apparatus 110 transmits W1_Data 1513 that is write target data to the detachable device 100 on the data line. In the processing shown in FIG. 15, a large capacity of data can be transferred using the data line.

In the example shown in FIG. 16, in the transmission/reception of data between the image capturing apparatus 110 and the detachable device 100, the data of the processing result of execution target processing in the detachable device 100 is included in a response to a command on the command line and transmitted to the image capturing apparatus 110. Note that the response to the command will sometimes be referred to as a command response hereinafter. In FIG. 16 as well, first, on the command line, the image capturing apparatus 110 transmits a write command W1_Com 1601 to the detachable device 100 to write data, and receives W1_Res 1602 that is a response to the command from the detachable device 100. Upon receiving the response W1_Res 1602 to the write command W1_Com 1601, the image capturing apparatus 110 transmits write target data W1_Data 1611 that is the target of image analysis processing to the detachable device 100 on the data line. Similarly, a write command W2_Com 1603 and a response W2_Res 1604, and a write command W2_Com 1605 and a response W2_Res 1606 are transmitted/received on the command line between the image capturing apparatus 110 and the detachable device 100. Then, W2_Data 1612 and W3_Data 1613 are transmitted from the image capturing apparatus 110 to the detachable device 100 as write data to the write command W2_Com 1603 and the write command W2_Com 1605, respectively.

Here, in this embodiment, the W2_Res 1604 stores the processing result of the execution target processing executed for the W1_Data 1611 by the detachable device 100. The processing result of the execution target processing is stored in, for example, the area of the DL_Data 1402 described with reference to FIG. 14. The W3_Res 1606 similarly stores the processing result of the execution target processing executed for the W2_Data 1612 by the detachable device 100. Note that in the example shown in FIG. 14, the DL_Data 1402 is a 3-bit area, and this is assumed to be enough for transmitting, for example, an analysis result such as the number of persons existing in an image. That is, it can be said that when indicating the number of persons existing in an image, the capacity of three bits capable of expressing zero to seven persons is a sufficient capacity. For this reason, when the DL_Data 1402 is used to transmit the processing result of image analysis processing, the image capturing apparatus 110 can obtain the processing result without using a read command.

As described above, in the example shown in FIG. 16, the processing result of the execution target processing executed by the detachable device 100 is transmitted from the detachable device 100 to the image capturing apparatus 110 by the command response to the write command. Since this procedure is executed by diverting a part of the command response in the procedure of write of the SD standard to transmission/reception of data, any other command need not be defined in the SD standard. Hence, using the existing standard, the period of communication by the read command is shorten or omitted, and the time in which the command line can be used to write data is made long, thereby speeding up data write. Additionally, since the same result as in a case of data read can be obtained even if the read command does not exist, data read can also be speeded up.

Note that in this embodiment, a case in which three bits in eight bits that form the response argument part 1314 in a response to a write command are used for information transmission in accordance with the existing SD standard has been described. However, this is merely an example, more than three bits may be ensured for information transmission by forming the response argument part 1314 using, for example, a larger number of bits such as 16 bits or by compressing the Status 1401. That is, if the regulation of the SD standard is changed by, for example, extending the size of a command or changing the configuration of the Status 1401, information may be transmitted in accordance with the changed standard.

In addition, when transmitting a read command to the detachable device 100, the image capturing apparatus 110 may transmit a small amount of data included the read command. According to this, since it is unnecessary to issue a write command in a situation in which a small amount of data needs to be written, the speed of the data write and read can be increased.

In this embodiment, a case in which the SD standard is used has been described. In a predetermined standard that returns a response when a predetermined control message such as a command is transmitted, the processing as shown in FIG. 16 can be executed. That is, when a small amount of data is stored in a response to a predetermined control message and transmitted, the frequency of data transmission from the response transmission side can be lowered, and data transmission from the predetermined control message transmission side can be executed at a high frequency. Additionally, if a small amount of data can be stored in the predetermined control message and transmitted, the frequency of data transmission from the message transmission side can be lowered, and data transmission from the message reception side can be executed at a high frequency. Note that the arrangement for transmitting data included in the predetermined control message, can be applied to various systems because a response need not be returned.

Figure 17:
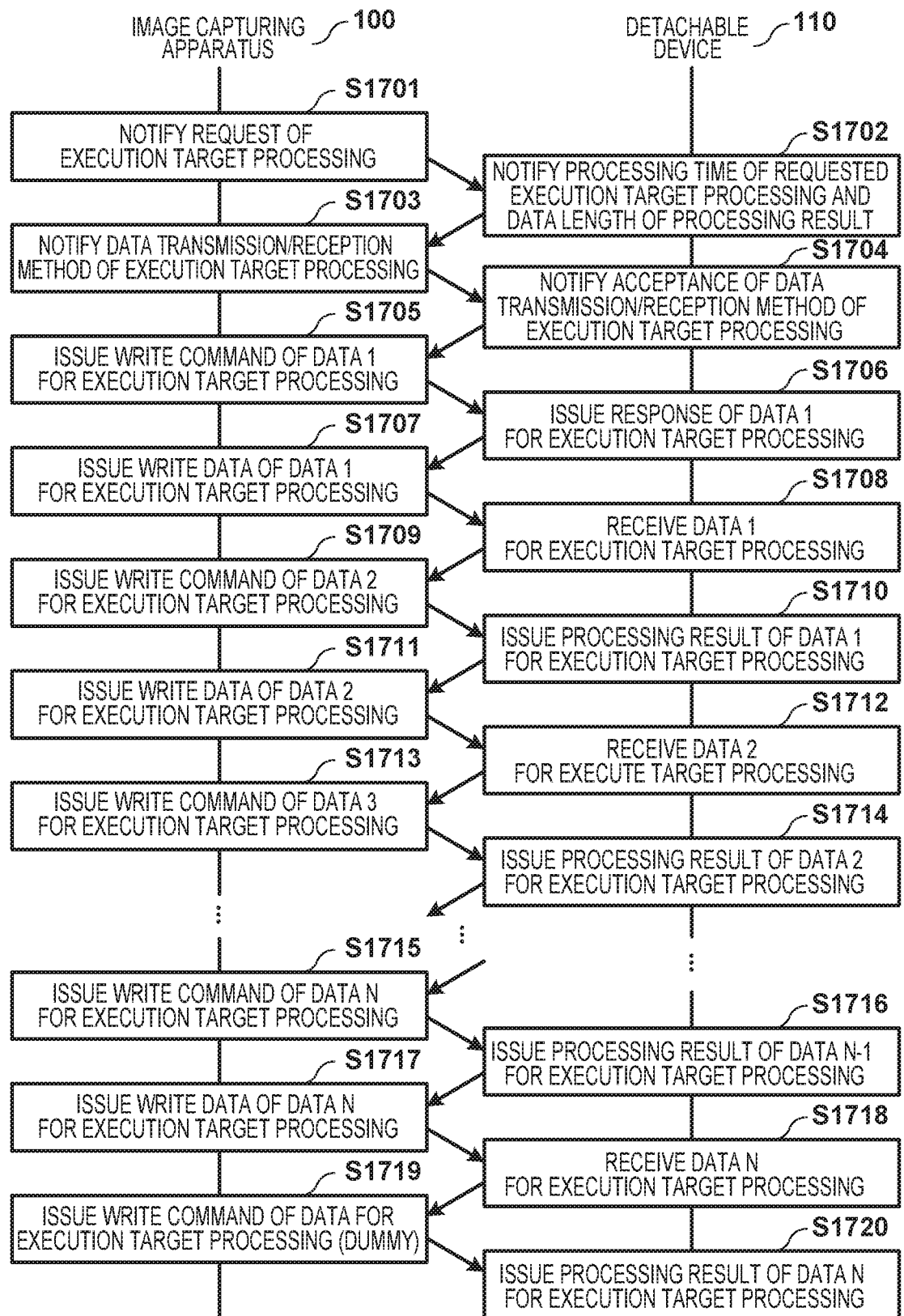
FIG. 17 is a flowchart showing an example of the procedure of processing executed in the system.

In the processing shown in FIG. 16, when transmitting a small amount of data, the data is included in a response to a command. However, the amount of data that can be included in the response is limited. For this reason, to transmit a large amount of data, the image capturing apparatus 110 further needs to issue a read command to obtain data even when the processing as shown in FIG. 16 is used. In addition, if a large amount of data can be transmitted on the command line, transmission/reception of a command and a response takes a long time. Hence, the efficiency may lower because the data line is not used. In some cases, it is appropriate to use not the processing shown in FIG. 16 but the processing shown in FIG. 15. In this embodiment, an appropriate one of the protocol shown in FIG. 15 and the protocol shown in FIG. 16 is used depending on the situation. The setting of the protocol to be used is determined by, for example, negotiation executed between the image capturing apparatus 110 and the detachable device 100. FIG. 17 shows an example of the procedure of processing executed by the image capturing apparatus 110 and the detachable device 100 in a case in which such negotiation is performed, and the processing shown in FIG. 16 is selected. Note that the processing shown in FIG. 17 is merely an example, and a part thereof may be replaced with another processing or omitted.

First, the image capturing apparatus 110 notifies the detachable device 100 of an execution request of execution target processing via the SD I/F unit 205 (step S1701). In response to the request, the detachable device 100 notifies the image capturing apparatus 110 of a processing time needed from the start to the end of the processing in the requested execution target processing and the information of the data length (data size) of data representing the processing result (step S1702). Note that the information of the processing time is, for example, information capable of specifying a time after the data of the processing target is transmitted to the detachable device 100 until a response including the result of the execution target processing for the data can be returned in a case in which the data transmission/reception method shown in FIG. 16 is used. The information of the processing time may be, for example, a value represented by a predetermined unit such as a microsecond or clock, or may be the value of the number of transmitted commands or responses after the data of the processing target is transmitted until a response is transmitted to return the processing result. Note that if the image capturing apparatus 110 can independently specify these pieces of information by calculation or the like, the process of step S1702 may be omitted.

Note that the image capturing apparatus 110 can complete transmission of a response to a command within a predetermined time as in a conventional standard. For example, the image capturing apparatus 110 can select the setting of execution target processing such that after output of the data of the processing target, a processing result of the data can be obtained within a predetermined time. For example, in the execution target processing, if the processing time becomes short along with the decrease in the input data size, the image capturing apparatus 110 can execute a setting for reducing the input data size of the execution target processing such that the processing result is obtained within a predetermined time. Similarly, the image capturing apparatus 110 may determine the setting of the execution target processing such that, for example, the transmission/reception method shown in FIG. 16 can be executed. For example, in the execution target processing, if the processing result can be suppressed to a predetermined number of bits in a case in which the input data size is smaller than a predetermined size, the image capturing apparatus 110 can execute setting of the execution target processing to reduce the input data size. For example, the detachable device 100 prepares a plurality of setting data capable of executing the same processing in correspondence with different input data sizes, and the image capturing apparatus 110 can instruct the detachable device 100 which one of the plurality of setting data should be used. This can prevent the time until a processing result is returned for input data from becoming long.

Based on the information notified in step S1702, the image capturing apparatus 110 notifies the detachable device 100 of the data transmission/reception method of the execution target processing (step S1703). For example, the image capturing apparatus 110 selects the data transmission/reception method shown in FIG. 16 if the data length is sufficiently short, and selects the data transmission/reception method shown in FIG. 15 if the data length is long. The image capturing apparatus 110 may select the data transmission/reception method depending on the processing time. For example, if processing is not completed until a response to the second command next to the first command at the time of transmission of processing target data, but the processing is completed at the timing of data transmission/reception based on the second command, the processing shown in FIG. 15 may be used. That is, when the second command is a read command, the image capturing apparatus 110 can quickly obtain the processing result. In addition, when requesting the data transmission/reception method shown in FIG. 16, based on the processing time, the image capturing apparatus 110 requests the timing of a response that returns a processing result of data after the processing target data is transmitted to the detachable device 100. If the request is accepted, after the transmission of the processing target data, the processing result of the data is returned to the image capturing apparatus 110 at the requested timing. Note that the request concerning the timing may be absent. In this case, for example, the response including the processing result may be transmitted at the shortest timing determined by the processing time. Note that if the data transmission/reception method shown in FIG. 15 is selected, the image capturing apparatus 110 can obtain the data of the processing result by issuing a read command after the timing of ending the processing after the transmission of the processing target data. In this case, since the detachable device 100 need only transmit the processing result in response to the read command, the timing need not be determined in advance. Hence, if the data transmission/reception method shown in FIG. 15 is selected, the image capturing apparatus 110 need not transmit the request of timing to the detachable device 100.

Based on the notification of step S1703, to accept the designated data transmission/reception method, the detachable device 100 transmits a notification for obtaining an acceptance concerning the data transmission/reception method to the image capturing apparatus 110 (step S1704).

For example, if the data size is larger than a predetermined value (for example, three bits), the image capturing apparatus 110 notifies, in step S1703, the detachable device 100 that the protocol shown in FIG. 15 should be used, and obtains an acceptance in step S1704. For example, if the data size is equal to or smaller than a predetermined value, the image capturing apparatus 110 notifies, in step S1703, the detachable device 100 that the protocol shown in FIG. 16 should be used, and obtains an acceptance in step S1704. If the detachable device 100, for example, does not support the data transmission/reception method notified by the image capturing apparatus 110, the data transmission/reception method can be rejected. For example, in a case in which the image capturing apparatus 110 notifies a data transmission/reception method using a command line with the DL_Data 1402 of an extended size, the detachable device 100 rejects the method if the self-device does not support such size extension. In this case, the detachable device 100 can transmit a rejection response to the image capturing apparatus 110 and promote it to use another data transmission/reception method. The image capturing apparatus 110 selects another data transmission/reception method in accordance with reception of the rejection response and executes the process of step S1703 again. The image capturing apparatus 110 determines to execute subsequent data communication using a data transmission/reception method (protocol) acceptable by the detachable device 100.

Note that, for example, in a case in which the processing result transmission timing is designated when the data transmission/reception method shown in FIG. 16 is designated, the detachable device 100 can also determine whether to accept the processing result transmission timing at the timing. If the transmission timing cannot be accepted, the detachable device 100 can transmit a rejection response or the lie to the image capturing apparatus 110. At this time, the rejection response may include information representing whether the data transmission/reception method cannot be accepted or the processing result transmission timing cannot be accepted.

In this way, the image capturing apparatus 110 and the detachable device 100 determine the data transmission/reception method by negotiation. Hereinafter, it is assumed that the image capturing apparatus 110 has notified the detachable device 100 that data is to be transmitted/received by the protocol shown in FIG. 16, and the detachable device 100 has accepted the data transmission/reception method.

Upon receiving an acceptance notification in step S1704, the image capturing apparatus 110 issues a write command to transmit input data 1 to be processed in the execution target processing (step S1705). Upon receiving the write command in step S1705, the detachable device 100 returns a response to the command to the image capturing apparatus 110 (step S1706). Note that since the execution target processing is not executed at this point of time, a response in which no processing result is stored is transmitted to the image capturing apparatus 110. Upon receiving the response in step S1706, next, the image capturing apparatus 110 issues write data and transmits input data 1 of a processing target to the detachable device 100 (step S1707). The detachable device 100 receives input data 1 transmitted from the image capturing apparatus 110 (step S1708).

Next, the image capturing apparatus 110 issues a write command to transmit input data 2 of a processing target (step S1709). Assume here that execution target processing for input data 1 input to the detachable device 100 is completed before a response to the command of step S1709 is prepared. The detachable device 100 transmits a response to the image capturing apparatus 110 in response to reception of the write command in step S1709. At this time, the response includes a processing result after the execution target processing is executed for input data 1. That is, in response to reception of the write command used to transmit input data 2 from the image capturing apparatus 110 to the detachable device 100, the detachable device 100 transmits the response including the processing result of input data 1 to the image capturing apparatus 110 (step S1710). Upon receiving the response in step S1710, the image capturing apparatus 110 is set in a state in which it can execute transmission of input data 2, and can also obtain the processing result of input data 1. In accordance with reception of the response in step S1710, the image capturing apparatus 110 subsequently issues write data and transmits input data 2 (step S1711), and the detachable device 100 receives the transmitted input data 2 (step S1712). From then on, similarly, the image capturing apparatus 110 issues a write command to transmit input data 3 of another processing target (step S1713), and the detachable device 100 transmits a response including the processing result of input data 2 to the image capturing apparatus 110 (step S1714).

After these processes are repeated, the image capturing apparatus 110 issues a write command to transmit input data N of the final processing target (step S1715). In response to the write command, the detachable device 100 transmits, to the image capturing apparatus 110, a response including the processing result of input data N−1 that has precedingly been input (step S1716). The image capturing apparatus 110 issues write data, and transmits the input data N to the detachable device 100 (step S1717), and the detachable device 100 receives the input data N (S1718). After that, the image capturing apparatus 110 issues a dummy write command to obtain the processing result of the input data N (step S1719). In response to the write command, the detachable device 100 transmits a response including the processing result of the input data N to the image capturing apparatus 110 (step S1720). Accordingly, the processing results of N (N is a positive integer) data that the image capturing apparatus 110 has input to the detachable device 100 are returned to the image capturing apparatus 110. Note that the image capturing apparatus 110 may read the processing result of the input data N by issuing not the dummy write command but a read command. That is, use of the dummy write command is merely an example, and obtaining of the processing result in a state in which there is no input data to the detachable device 100 may be performed by another method.

Figure 18:
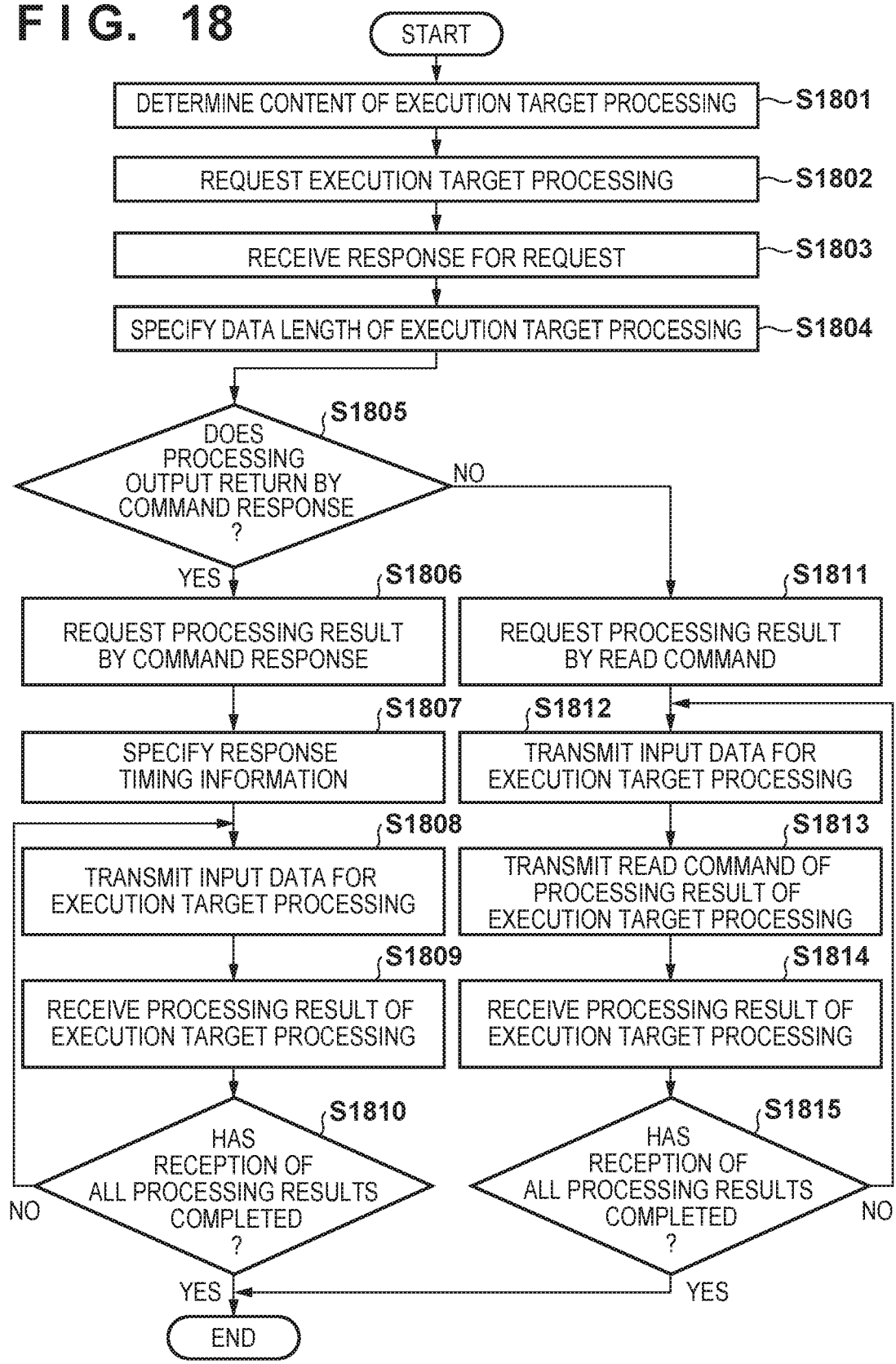
FIG. 18 is a flowchart showing the first example of the procedure of data transmission/reception processing executed by the image capturing apparatus.

FIG. 18 shows an example of the procedure of processing executed by the image capturing apparatus 110. This processing can be implemented by, for example, executing a predetermined program and controlling various kinds of functional units by the arithmetic processing unit 203. Note that this processing is started when, for example, the input/output apparatus 130 instructs execution of predetermined image analysis processing.

First, the image capturing apparatus 110 determines the contents of execution target processing (step S1801). This execution target processing indicates processing to be executed by the detachable device 100. The execution target processing is determined by, for example, determining processing allocation between the image capturing apparatus 110 and the detachable device 100 in accordance with processing to be described later. Next, the image capturing apparatus 110 transmits an execution target processing execution request to the detachable device 100 (step S1802), and receives a response to the execution request from the detachable device 100 (step S1803). The image capturing apparatus 110 specifies the data length of data to be output as a processing result when the execution target processing is executed by the detachable device 100 (step S1804). The image capturing apparatus 110 may specify the data length by, for example, a notification from the detachable device 100 as in step S1702 of FIG. 17, or may independently specify the data length without depending on provided information. For example, the image capturing apparatus 110 may extract the data length stored in advance in the image capturing apparatus 110 in association with the execution target processing, or may calculate the data length based on the information of execution target processing or setting of image capturing. Based on the data length specified in step S1804, the image capturing apparatus 110 determines whether to use the method of returning an output result by a command response as shown in FIG. 16 as the data transmission/reception method for the detachable device 100 (step S1805). For example, if the data length of a processing result is three bits, eight bits, or the like and is equal to or less than a predetermined length, the image capturing apparatus 110 selects the method of returning an output result by a command response. In this case, if the data length is 16 bits or the like and exceeds a predetermined length, the image capturing apparatus 110 can select the method of returning an output result by a read command.

If the data of an output result of the detachable device 100 is to be received by a command response (YES in step S1805), the image capturing apparatus 110 requests the detachable device 100 to use the data transmission/reception method by a command response (step S1806). To accept the data transmission/reception method by a command response, the detachable device 100 notifies the image capturing apparatus 110 of the timing information of the command response according to the processing time of the execution target processing. By this notification, the image capturing apparatus 110 obtains the timing information of the command response (step S1807). Note that the timing information of the command response may be specified in parallel to, for example, the data length specifying in step S1804. For example, the image capturing apparatus 110 can obtain the timing information of the command response from the detachable device 100 in step S1702 of FIG. 17. In addition, the image capturing apparatus 110 may specify the timing of the command response to notify a processing result based on the processing time stored in advance in the image capturing apparatus 110 in association with the execution target processing and a period of transmitting/receiving a command and a response.

The image capturing apparatus 110 transmits input data of the target of the execution target processing to the detachable device 100 (step S1808). The image capturing apparatus 110 transmits input data in the order of issuance of a write command, reception of a response to the command, and issuance of write data, as described above. After that, while continuing transmission of input data, the image capturing apparatus 110 receives a command response including the data of the processing result of past input data at the timing specified in step S1807 (step S1809). For example, if processing is completed after the input data is input to the detachable device 100 by a write command and before the transmission timing of the command response to the next write command, the data of the processing result is transmitted by the next command response. That is, the processing result of input data 1 is transmitted by the command response to the write command for input data 2. In addition, if processing is completed after the input data is input to the detachable device 100 and before the transmission timing of the Nth command response, the data of the processing result is transmitted by the Nth command response. For example, if N=2, the processing result of input data 1 is transmitted by the command response to the write command for input data 3. In this case, the command response to the write command for input data 2 does not include the processing result. Note that a detailed method of this processing will be described later as the second example with reference to FIG. 21. In this way, based on the tuning specified in step S1807, the image capturing apparatus 110 can specify of which data the processing result received by the command response is. Even if input data of a processing target does not exist, the image capturing apparatus 110 repeats transmission of dummy data (step S1808) and obtaining of a processing result (step S1809) during the time when not all processing results are output (NO in step S1810). If all processing results are received (YES in step S1810), the image capturing apparatus 110 ends the processing.

If the data of an output result of the detachable device 100 is not to be received by a command response (NO in step S1805), the image capturing apparatus 110 requests the detachable device 100 to use the data transmission/reception method using a read command (step S1811). As in step S1808, the image capturing apparatus 110 transmits input data of the processing target to the detachable device 100 (step S1812). To obtain the data of the processing result of the input data, the image capturing apparatus 110 transmits a read command to the detachable device 100 (step S1813), and reads the data of the processing result from the detachable device 100 based on the read command (step S1814). After that, the image capturing apparatus 110 repeats the processes of steps S1812 to S1814 until processing results are obtained for all processing target data (NO in step S1815), and ends the processing when all processing results are obtained (YES in step S1815).

Figure 19:
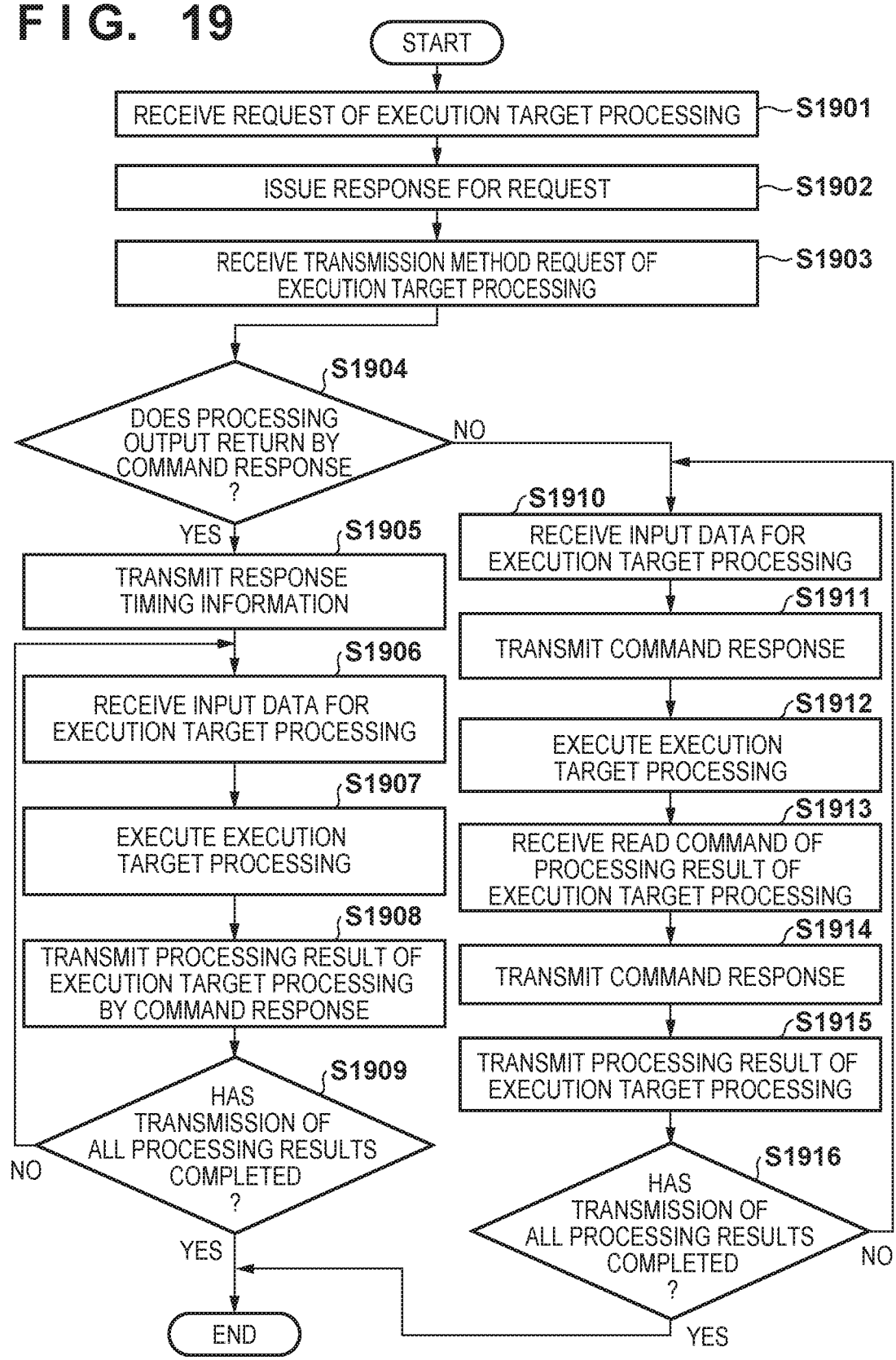
FIG. 19 is a flowchart showing an example of the procedure of data transmission/reception processing executed by the detachable device.

FIG. 19 shows an example of the procedure of processing executed by the detachable device 100. This processing can be implemented by, for example, executing a predetermined program by the FPGA 402. Note that this processing becomes executable when, for example, the detachable device 100 is mounted in the image capturing apparatus 110, and is started upon receiving an execution target processing execution request from the image capturing apparatus 110 (step S1901).

After the reception of the execution request (step S1901), the detachable device 100 transmits a response to the execution request to the image capturing apparatus 110 (step S1902). The detachable device 100 receives a request of a data transmission/reception method for a processing result from the image capturing apparatus 110 (step S1903). Based on the received request, the detachable device 100 executes negotiation for the data transmission/reception method with the image capturing apparatus 110 (step S1904).

If it is requested that the data of a processing result is transmitted to the image capturing apparatus 110 by a command response, and the detachable device 100 accepts it (YES in step S1904), the detachable device 100 notifies the image capturing apparatus 110 of the timing information of the command response (step S1905). Note that if the image capturing apparatus 110 can independently specify the timing information of the command response, the process of step S1905 may be omitted. Upon receiving the input data of the processing target from the image capturing apparatus 110 (step S1906), the detachable device 100 executes the execution target processing for the received data (step S1907), and transmits a command response including the processing result to the image capturing apparatus 110 (step S1908). During the time when transmission of the processing result is not completed for all processing target data (NO in step S1909), the detachable device 100 repetitively executes the processes of steps S1906 to S1908. If transmission of the processing result is completed for all processing target data (YES in step S1909), the detachable device 100 ends the processing.

On the other hand, if it is requested that the data of a processing result is transmitted to the image capturing apparatus 110 without using a command response, and the detachable device 100 accepts it (NO in step S1904), the detachable device 100 transmits data to the image capturing apparatus 110 by the method using a read command. In this case, the detachable device 100 receives input data of a processing target from the image capturing apparatus 110 (step S1910). Additionally, when the input data is received, the detachable device 100 transmits a command response to the write command to the image capturing apparatus 110 (step S1911). The detachable device 100 then executes the execution target processing for the received data (step S1912). After that, the detachable device 100 receives a read command from the image capturing apparatus 110 (step S1913), and transmits a command response to the read command to the image capturing apparatus 110 (step S1914). The detachable device 100 transmits, as read data, the processing result of the execution target processing obtained in step S1912 to the image capturing apparatus 110 (step S1915). During the time when transmission of the processing result is not completed for all processing target data (NO in step S1916), the detachable device 100 repetitively executes the processes of steps S1910 to S1915. If transmission of the processing result is completed for all processing target data (YES in step S1916), the detachable device 100 ends the processing.

As described above, in this embodiment, data transmission/reception between the image capturing apparatus 110 and the detachable device 100 can be performed using a command response and, for example, whether to use the method is determined in accordance with the data size of a processing result. Hence, in an environment suitable for returning a processing result by a command response, the frequency of issuing a read command is suppressed, and the frequency of write data is increased, thereby shortening the time needed for data transmission/reception. In addition, for example, if the data length of a processing result exceeds a predetermined length, data is transmitted/received by the method using a read command, thereby transmitting/receiving data more efficiently than when using a command response. Hence, the time needed for data transmission/reception can be shortened by appropriately determining, based on the situation, which method should be used.

Note that in the above-described example, a case in which the data transmission/reception method is selected from two protocols, that is, the protocol shown in FIG. 15 and the protocol shown in FIG. 16 has been described. However, the data transmission/reception method may be selected three or more protocols. That is, if there exist a plurality of protocols for transmitting/receiving data between the image capturing apparatus 110 and the detachable device 100, it is determined by negotiation which one of the protocols should be used, and a protocol other than those exemplified may be used. This makes it possible to use an appropriate protocol in accordance with the situation.

(Second Example of Transfer of Data)

Another example of the method of transmitting/receiving data between the image capturing apparatus 110 and the detachable device 100 will be described with reference to FIG. 20. In the example shown in FIG. 20, a method of transmitting a command response including the data of a processing result of execution target processing by the detachable device 100 is used as the data transmission/reception method between the image capturing apparatus 110 and the detachable device 100, as in the example shown in FIG. 16. However, the command response for returning the processing result is not the command response corresponding to the immediately preceding write command. That is, the example of FIG. 20 shows a case in which the timing information of the command response specified in step S1807 of FIG. 18 specifies returning a processing result by the second or subsequent command response.

Figure 20:
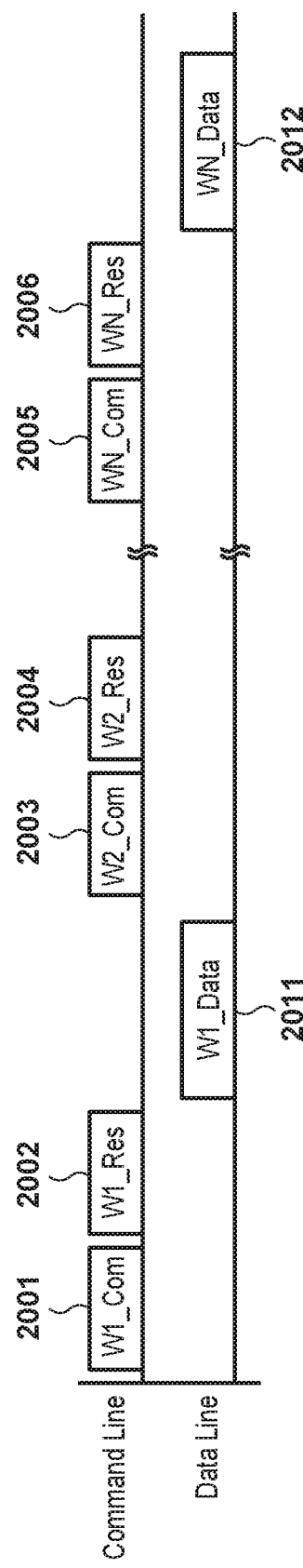
FIG. 20 is a view showing the second example of the procedure of data transmission/reception in a case in which a processing result is transmitted/received using a command response.

In FIG. 20, first, a write command W1_Com 2001 used to perform the first write is transmitted on the command line from the image capturing apparatus 110 to the detachable device 100. As a response to the command, W1_Res 2002 is transmitted from the detachable device 100 to the image capturing apparatus 110. Then, on the data line, write data W1_Data 2011 corresponding to the write command W1_Com 2001 is transmitted from the image capturing apparatus 110 to the detachable device 100. Similarly, on the command line, a write command W2_Com 2003 used to perform the second write is transmitted from the image capturing apparatus 110, and W2_Res 2004 is transmitted from the detachable device 100 as a response to the command. Note that after that, write data corresponding to the write command W2_Com 2003 is transmitted on the data line, although not illustrated. In addition, an Nth write command WN_Com 2005 is transmitted from the image capturing apparatus 110, and WN_Res 2006 is transmitted from the detachable device 100 as a command response. After that, write data WN_Data 2012 corresponding to the write command W3_Com 2005 is transmitted on the data line from the image capturing apparatus 110 to the detachable device 100. In this example, the processing result of the W1_Data 2011 is stored in the WN_Res 2006. This processing result is stored in the DL_Data 1402 shown in FIG. 14. As described above, in this example, a processing result is returned from the detachable device 100 to the image capturing apparatus 110 using a command response to an appropriate write command in accordance with the processing time of execution target processing in the detachable device 100.

Figure 21A:
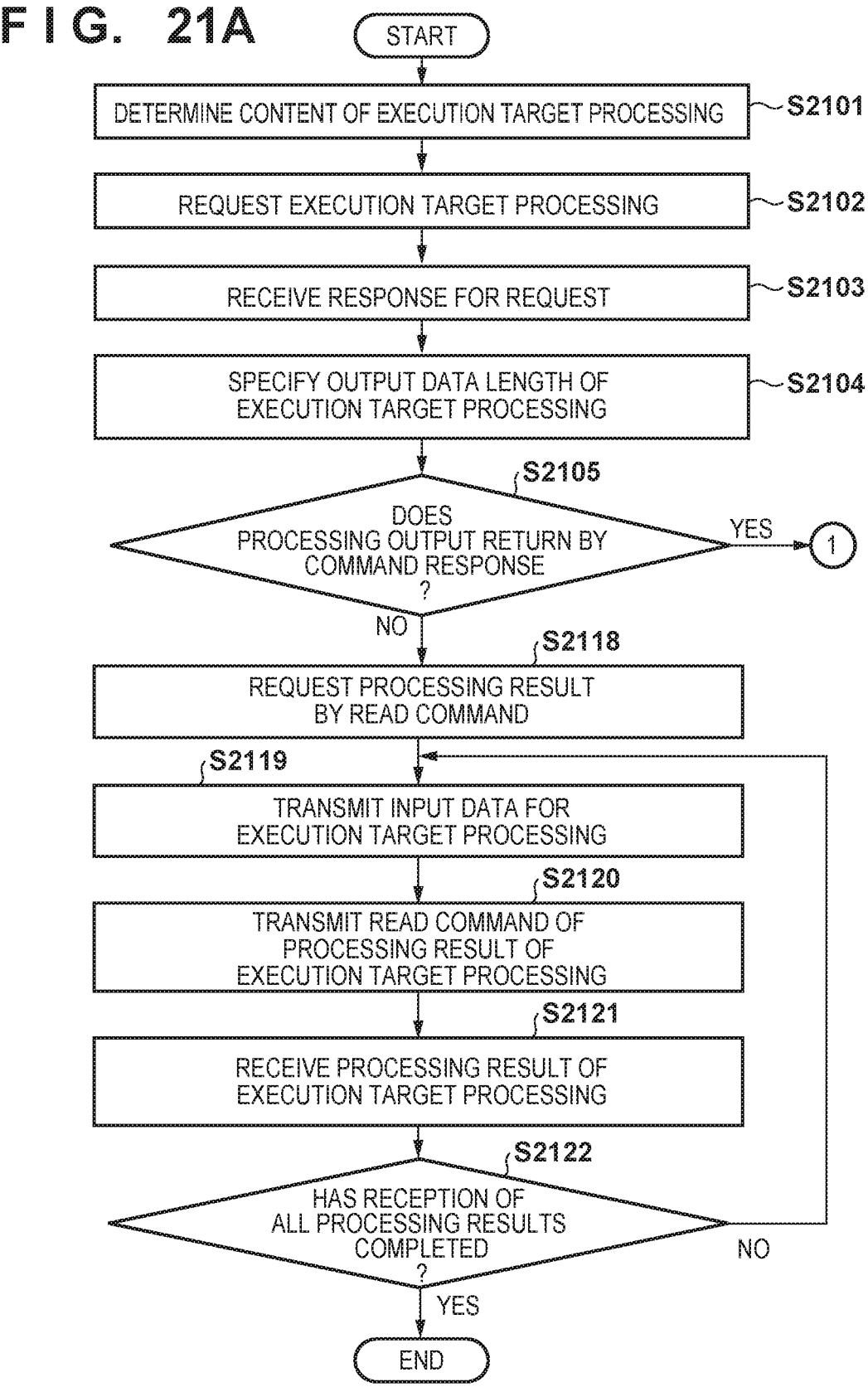
FIGS. 21A and 21B are flowcharts showing the second example of the procedure of data transmission/reception processing executed by the image capturing apparatus.
Figure 21B:
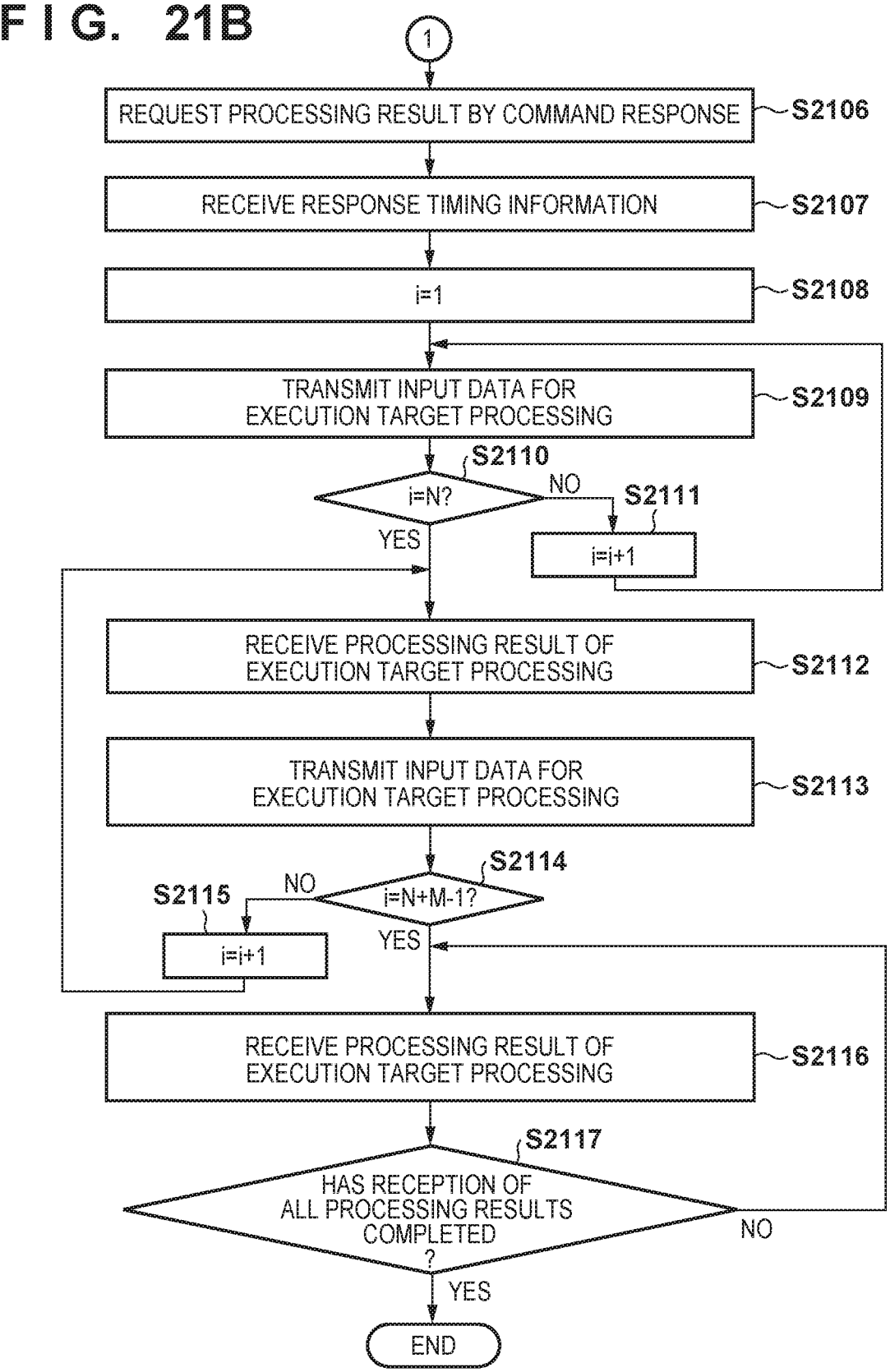

FIG. 21 shows an example of the procedure of processing executed by the image capturing apparatus 110 when performing data transmission/reception as shown in FIG. 20. The processes of steps S2101 to S2107 and S2118 to S2122 are the same as the processes of steps S1801 to S1807 and S1811 to S1815 in FIG. 18, and a description thereof will be omitted here.

In step S2107, the image capturing apparatus 110 receives information representing which command response includes the processing result of execution target processing and is transmitted by the detachable device 100. The image capturing apparatus 110 determines, by the information, how many commands should be transmitted before the command response including the processing result can be received from the detachable device 100. Note that it is assumed here that the command response including the processing result can be received after transmission of N commands. The image capturing apparatus 110 performs initialization to count the number of commands, and sets a count value i to 1 (step S2108). Note that count and initialization may be done by another method if the number of commands can be specified. Next, the image capturing apparatus 110 transmits input data of a processing target to the detachable device 100 (step S2109). The image capturing apparatus 110 determines whether the number of transmitted commands has reached N (whether i=N) (step S2110). If the number of transmitted commands has not reached N (NO in step S2110), the count value i is incremented by one (step S2111), and the process of step S2109 is repetitively executed. Note that the determination of step S2110 is performed when the write command is transmitted to transmit data in step S2109. On the other hand, if the number of transmitted commands has reached N (YES in step S2110), the image capturing apparatus 110 receives the processing result by a command response (step S2112). Here, the command response received when the count value is i=N−1 includes the processing result of the first input data. Note that the value N is determined by the processing time of the execution target processing. In addition, the processing time of the execution target processing can be a value that can be specified in advance in accordance with the processing of the detachable device 100. However, the processing time of the execution target processing may vary depending on the processing load of the detachable device 100, or the like. In this case, the image capturing apparatus 110 can obtain, from the detachable device 100, information capable of specifying the timing of receiving the processing result, such as the processing time or the value N.

After that, input data of the execution target processing is transmitted to the detachable device 100 (step S2113). Note that when executing the process of step S2113 for the first time, write data corresponding to the Nth command is issued, and issuance of a write command and issuance of write data are performed from then on. The image capturing apparatus 110 determines whether the number of transmitted commands has reached N+M−1 (step S2114). If the number of transmitted commands has not reached N+M−1 (NO in step S2114), the count value i is incremented by one (step S2115), and the process returns to step S2112. Here, the value M corresponds to the total number of input data necessary for the execution target processing. That is, when commands are transmitted N+M−1 times, Nth to (N+M−1)th command responses are received, and this should make it possible to receive all processing results. If the number of transmitted commands has reached N+M−1 (YES in step S2114), the image capturing apparatus 110 receives the remaining processing results from the detachable device 100 (step S2116). If all processing results are not received (NO in step S2117), the image capturing apparatus 110 repetitively executes the process of step S2116. If all processing results are received (YES in step S2117), the image capturing apparatus 110 ends the processing. Note that if some reception data are not correctly received, the image capturing apparatus 110 may determine that all processing results are not received and issue a read command to obtain the data that are not correctly received.

Note that, for example, while actual input data exists, the image capturing apparatus 110 may obtain a processing result by a command response, and after all input data are input to the detachable device 100, the image capturing apparatus 110 may not issue a write command. In this case, for example, the image capturing apparatus 110 may issue a read command after a predetermined time to obtain remaining processing results at once. This makes it possible to prevent waste of a hand caused by transmission of dummy data and perform transmission/reception of another data in place of transmission of a write command and dummy data.

As described above, in this processing example, the timing of returning a command response including a processing result is appropriately set in accordance with the time until execution target processing is completed in the detachable device 100. It is therefore possible to use the protocol for returning a processing result by a command response without depending on the processing time of execution target processing.

(Presentation of Information to User and Acceptance of User Selection)

Figure 22:
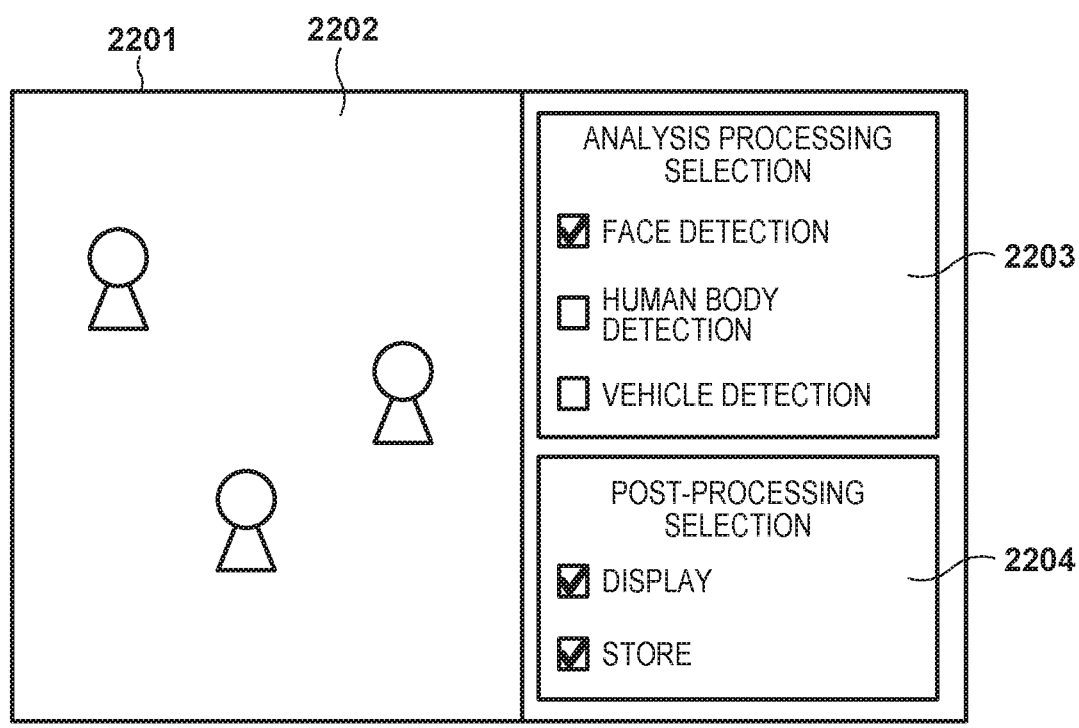
FIG. 22 is a view showing an example of a user interface.

Examples of presentation of a captured image, an integrated processing list, and post-processing list to the user and a method of accepting user selection will be described. FIG. 22 shows an example of screen display of a captured image, an integrated processing list, and a post-processing list via the display unit 703. By the display screen, for example, a user interface 2201 is displayed. The user interface 2201 includes, for example, a captured image display area 2202, an integrated processing list display area 2203, and a post-processing list display area 2204. The user confirms these areas, thereby ascertaining the captured image, the integrated processing list, and the post-processing list.

Note that the list to be displayed is not limited to only the integrated processing list. For example, the image capturing apparatus 110 can store a second processing list for a certain detachable device 100 in the storage unit 303 and transmit the second processing list stored in the storage unit 303 to the input/output apparatus 130 even if the detachable device 100 is not mounted. That is, the image capturing apparatus 110 may output the second processing list for the detachable device 100 mounted in the past. In this case, the input/output apparatus 130 can display analysis processing that is included in the second processing list but not in the integrated processing list in a gray-out state as analysis processing that is enabled by mounting the detachable device 100. It is therefore possible to promote the user to mount the detachable device 100 in the image capturing apparatus 110 to make the processing in the gray-out state executable. Additionally, for example, if the image capturing apparatus 110 and the detachable device 100 have identical processing functions, these can be integrated and displayed as one process. In this case, the image capturing apparatus 110 can determine which one of the image capturing apparatus 110 and the detachable device 100 executes the processing. This determination method will be described later.

Note that the input/output apparatus 130 may display analysis processing and post-processing displayed for the user such that the user can identify which one of the image capturing apparatus 110 and the detachable device 100 should perform each processing. For example, when creating an integrated processing list, the image capturing apparatus 110 makes the integrated processing list include information representing which one of the first processing list and the second processing list includes each analysis processing included in the integrated processing list. In accordance with the information representing which one of the first processing list and the second processing list includes each analysis processing included in the integrated processing list, the input/output apparatus 130 displays each analysis processing while changing the character color. This allows the user to confirm whether each processing is processing executable even if the detachable device 100 is removed. Note that if the image capturing apparatus 110 and the detachable device 100 can execute identical processes, and these are integrated and displayed as one process, this process can be displayed in a character color corresponding to the image capturing apparatus 110. This is because the process can be executed even if the detachable device 100 is removed. However, the present invention is not limited to this, and processing may be displayed in a character color representing that it is processing executable by both the image capturing apparatus 110 and the detachable device 100.

In addition, if processing that is executable when the image capturing apparatus 110 and the detachable device 100 cooperate is included in the integrated processing list, for the processing, information representing the necessity of cooperation may be included in the integrated processing list. In this case, processing implemented when the image capturing apparatus 110 and the detachable device 100 cooperate may be displayed in a still another character color. For example, face authentication processing can be implemented by a function group of a face detection processing function, a face characteristic extraction processing function, and a face characteristic collation processing function. It is assumed that the image capturing apparatus 110 has the face detection processing function and the face characteristic extraction processing function, and the detachable device 100 has the face characteristic collation processing function. In this case, on the user interface 2201, for example, the face detection processing and the face characteristic extraction processing are displayed by blue characters, the face characteristic collation processing is displayed by red characters, and the face authentication processing is displayed by green characters.

Note that changing the character color is merely a form configured to display the functions such that which one of the image capturing apparatus 110 and the detachable device 100 should execute the functions or whether a function is executed by cooperation of these can be distinguished. Such distinguishable display may be done by another form. For example, the execution constituent of processing may explicitly be displayed by changing the background color of each processing. In addition, the difference of the execution constituent may be indicated by a character string. For example, a character string indicating the image capturing apparatus 110 can be added after a character string indicating processing to be executed by the image capturing apparatus 110, and a character string indicating the detachable device 100 can be added after a character string indicating processing to be executed by the detachable device 100. To a character string indicating processing implemented by cooperation of the image capturing apparatus 110 and the detachable device 100, a character string indicating cooperation of the image capturing apparatus 110 and the detachable device 100 can be added. As described above, the image capturing apparatus 110 provides, to the input/output apparatus 130, information representing processes included in the first processing list and processes included in the second processing list in a distinguishable manner, thereby causing the display unit 703 of the input/output apparatus 130 to display the execution constituent of each process in a distinguishable manner. Even if the image capturing apparatus 110 includes a display unit, the execution constituent of each process can be displayed in a distinguishable manner by preparing information representing processes included in the first processing list and processes included in the second processing list in a distinguishable manner. That is, by outputting the information representing processes included in the first processing list and processes included in the second processing list in a distinguishable manner, the image capturing apparatus 110 can cause an arbitrary display device to display the execution constituent of each process in a distinguishable manner.

The user can select execution target processing from the integrated processing list displayed in the integrated processing list display area 2203 of the user interface 2201 via the operation unit 704. In addition, the user can select execution target post-processing from the processing list displayed in the post-processing list display area 2204 via the operation unit 704. For example, FIG. 22 shows an example in which the user selects "face detection" processing as execution target analysis processing, and selects "display" and "storage" as execution target post-processing. Note that in this embodiment, an example in which only one execution target processing is selected is shown. However, the present invention is not limited to this. The system may be configured to allow the user to select a plurality of execution target processes. For example, in addition to "face detection", at least one of "human body detection" and "vehicle detection" may be selected. If one process is selected, selection of another process may be inhibited. As an example, if "human body detection" is selected in a state in which "face detection" is selected in the integrated processing list display area 2203 shown in FIG. 22, selection of "face detection" may be canceled. FIG. 22 shows an example in which both of two post-processes are selected. However, only one of them may be selectable.

Based on the selection of execution target processing and post-processing by the user, the image capturing apparatus 110 is notified of the selection result in step S1007 of FIG. 10. In addition, the control unit 702 of the input/output apparatus 130 may confirm the state of user selection for every predetermined period and notify the image capturing apparatus 110 of execution target processing depending on which processing is selected as the execution target. That is, the processes of steps S1005 to S1007 may periodically be executed, or selection in steps S1005 and S1006 may always be monitored, and the process of step S1007 may be executed when the selection state has changed.

Figure 23:
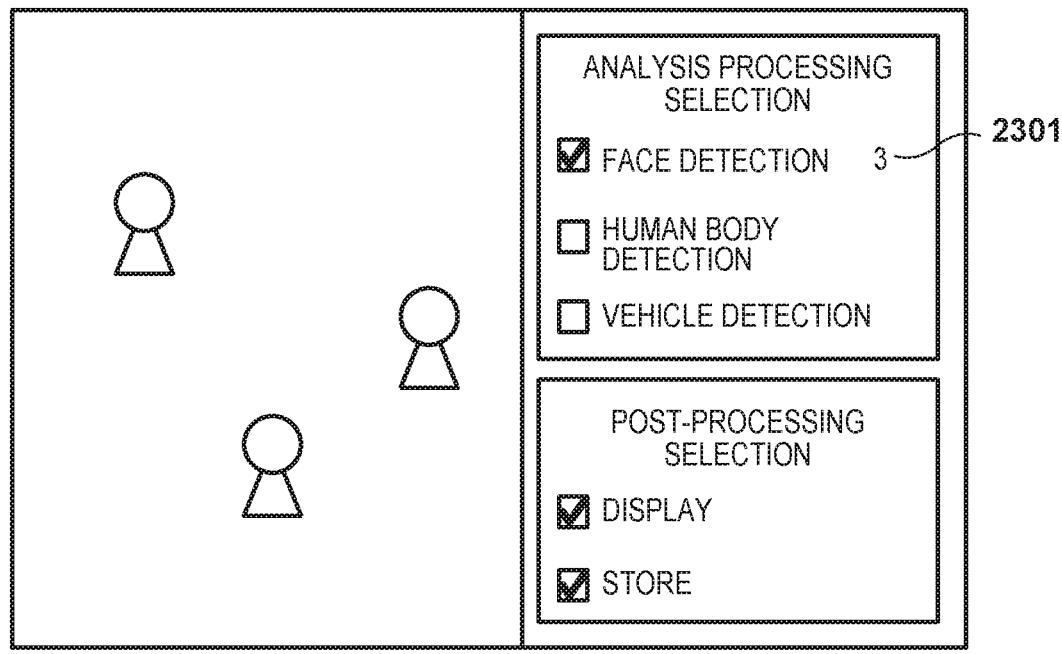
FIG. 23 is a view showing an example of the user interface in a state in which a processing result is shown.

FIG. 23 shows an example of a method of displaying information in step S1203 in a case in which "face detection" is selected as the execution target processing, and "display" is selected as the execution target post-processing. In this example, the number 2301 of persons detected by face detection processing is displayed as the result of analysis processing on the screen of the user interface 2201 shown in FIG. 22. Note that FIG. 23 is merely an example, and the result of processing may be displayed separately from the user interface 2201, and the result of processing may be displayed in another area of the user interface 2201.

In addition, a priority may be set for each of the execution target processing and post-processing selected by the user. For example, if a plurality of execution target processes exist, and priorities are set, the control unit 304 of the image capturing apparatus 110 executes processing (for example, the processes of steps S1103 to S1107) shown in FIG. 11 for each execution target process in the order of priorities. Note that the calculation resource or network resource on the side of the image capturing apparatus 110 may be assigned based on the priority. For example, a process of high priority may be executed for a video for every first predetermined number of frames, and a process of low priority may be executed for the video for every second predetermined number of frames, which is larger than the first predetermined number of frames. That is, the frequency of executing processing may be determined by priority. In addition, the frequency of transmitting the result of processing of high priority to the input/output apparatus 130 may be higher than the frequency of transmitting the result of processing of low priority to the input/output apparatus 130.

(Processing of Determining Processing Allocation Between Image Capturing Apparatus and Detachable Device)

Figure 24:
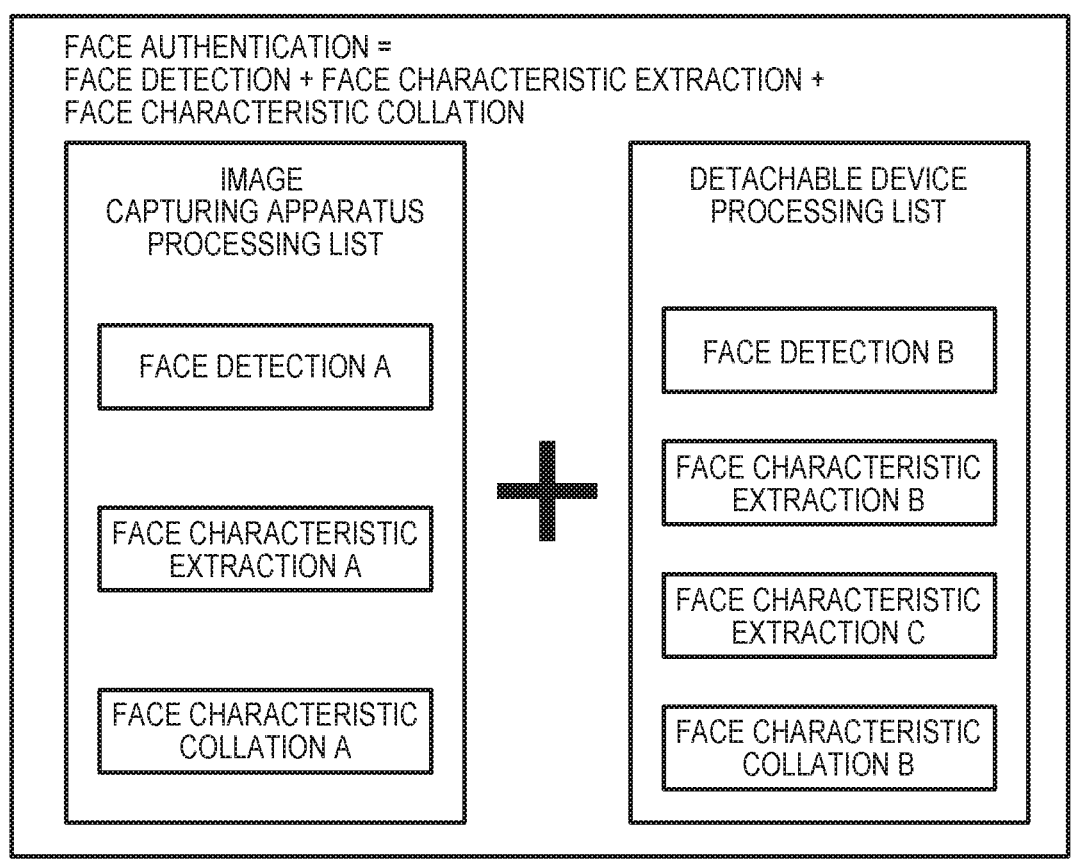
FIG. 24 is a view schematically showing an image analysis processing group for face authentication processing and a processing group executable in each apparatus.

When a plurality of processes are combined, a predetermined process may become executable. For example, face authentication processing can be executed by combining three processes, that is, face detection processing, face characteristic extraction processing, and face characteristic collation processing. If the image capturing apparatus 110 and the detachable device 100 can execute at least one of the three processes, the processes can be allocated between the apparatuses and executed. Additionally, in the image capturing apparatus 110 and the detachable device 100, for example, for at least one of the three processes described above, different processing functions suitable for each condition such as a condition (for example, an image capturing condition) under which data as the processing target is obtained or an analysis target can be prepared. For example, different processing functions may be prepared for processing for an image captured in daytime and processing for an image captured in nighttime. For example, as shown in FIG. 24, the image capturing apparatus 110 and the detachable device 100 are configured to have the face detection processing function, the face characteristic extraction processing function, and the face characteristic collation processing function and execute face authentication processing. Note that even if the image capturing apparatus 110 and the detachable device 100 have the same functions, suitable conditions to use them can be different. In addition, each of the image capturing apparatus 110 and the detachable device 100 may have a plurality of processing functions capable of executing similar processes, like the detachable device 100 shown in FIG. 24, which has two face characteristic extraction processing functions. Accordingly, when processing is appropriately allocated between the image capturing apparatus 110 and the detachable device 100, processing suitable for various conditions can be executed.

Note that even if the image capturing apparatus 110 and the detachable device 100 perform the same processing, advantages and disadvantages occur because of the difference in the arrangement. For example, concerning the operation accuracy, the arithmetic processing unit 203 of the image capturing apparatus 110 can be advantageous because the bit width with respect to data is large. Concerning the operation speed, the detachable device 100 can be advantageous because the operation is performed by the logic circuit on the FPGA 402. If there exist a plurality of processing functions capable of executing the same processing, it is advantageous to select an appropriate processing function based on the environment of image capturing of the image capturing apparatus 110. Considering such circumstances, if the detachable device 100 has a processing function, it is important to appropriately determine whether to actually use the processing function and appropriately select a processing function to be used. Hence, a method of automatically selecting whether to cause the detachable device 100 to execute processing, whether to cause the image capturing apparatus 110 to execute processing, or whether to cause the image capturing apparatus 110 and the detachable device 100 to cooperatively execute processing will be described below. In addition, a method of automatically selecting a processing function to be used by, for example, determining which one of a plurality of processing functions should be used in a case in which the image capturing apparatus 110 and the detachable device 100 have a plurality of processing functions capable of executing the same processing will also be described. Note that three processing examples will individually be described below, and these may be used in combination.

FIRST PROCESSING EXAMPLE

The first processing example of selecting a processing function to be used will be described with reference to FIG. 25. In this example, to satisfy performance necessary for performing image analysis processing, a processing function to be used is selected from processing functions provided in the image capturing apparatus 110 and the detachable device 100. For example, this processing can be executed in a case in which there is a condition that, for example, processing needs to be performed at a predetermined frame rate or higher, and both the image capturing apparatus 110 and the detachable device 100 can execute the same processing.

In this processing, first, the user selects execution target processing via, for example, the user interface 2201 shown in FIG. 22 on the input/output apparatus 130 (step S2501). Based on the user selection, the control unit 702 of the input/output apparatus 130 transmits an execution instruction command for the execution target processing to the image capturing apparatus 110. The control unit 304 of the image capturing apparatus 110 obtains the execution instruction command representing the selected process from the input/output apparatus 130. Note that if the image capturing apparatus 110 has an information presentation function of presenting executable processing and an operation acceptance function of causing the user to make a selection, the user may directly operate the image capturing apparatus 110 and instruct the execution target processing to the control unit 304 of the image capturing apparatus 110.

The control unit 304 of the image capturing apparatus 110 confirms processing performance needed when executing the selected processing (step S2502). As for the setting of the processing performance, a set value may be determined in advance for each processing, or the user may set a target value when selecting processing. The control unit 304 executes, in the image capturing apparatus 110, the processing selected in step S2501 (step S2503). Note that this processing can be executed in parallel to image capturing. In addition, a function that exists only in the detachable device 100 in the processing functions to be used when executing the selected processing is executed by the detachable device 100 but not executed in the image capturing apparatus 110.

During execution of the processing of after completion of processing of a predetermined amount of data, the control unit 304 confirms whether the executed processing satisfies the processing performance set in step S2502 (step S2504). Upon confirming that the processing performance is satisfied (YES in step S2504), the control unit 304 returns the process to step S2503 to directly continue the processing. On the other hand, upon confirming that the processing performance is not satisfied (NO in step S2504), the control unit 304 advances the process to step S2505 to attempt a change to a processing allocation capable of satisfying the processing performance.

In step S2505, concerning processing that is a part of the processing executed by the image capturing apparatus 110 and is executable even in the detachable device 100, the execution constituent is changed to the detachable device 100. Since processes executable by the detachable device 100 are ascertained, the control unit 304 of the image capturing apparatus 110 selects processing to be transferred to the detachable device 100 from the list (second processing list) of processes and changes the execution constituent of the processing. When the change is completed, the processing selected in step S2501 is allocated to the control unit 304 and the analysis unit 501 and executed (step S2506). After that, the control unit 304 confirms whether to return the processing function from the detachable device 100 to the image capturing apparatus 110 (step S2507). When the processing is returned to the image capturing apparatus 110, the processing can be executed at a higher operation accuracy.

If, for example, the reason why it is determined in step S2504 that the processing performance cannot be satisfied is a temporary high load state or the like, and the state is eliminated, the control unit 304 can determine that the process can be returned to the image capturing apparatus 110. That is, the control unit 304 can determine, based on the processing load of the image capturing apparatus 110, which one of the image capturing apparatus 110 and the detachable device 100 should execute the processing. Note that in addition to causing the detachable device 100 to execute processing in a state in which the processing load of the image capturing apparatus 110 is high, as described above, the image capturing apparatus 110 may be caused to execute processing in a state in which the processing load of the detachable device 100 is high. That is, which one of the image capturing apparatus 110 and the detachable device 100 should execute processing may be determined based on the processing load of the detachable device 100.

Additionally, if, for example, the target value of the processing performance is lowered by the user, the control unit 304 can determine that the processing can be returned to the image capturing apparatus 110. Upon determining to return the processing to the image capturing apparatus 110 (YES in step S2507), the control unit 304 changes the execution constituent of the part of the processing, which has been executed by the detachable device 100, to the image capturing apparatus 110 (step S2508). Note that the processing whose execution constituent is returned to the image capturing apparatus 110 in step S2508 may be a part or whole of the processing whose execution constituent was changed to the detachable device 100 in step S2505. After the execution constituent of at least the part of the processing is returned to the image capturing apparatus 110, the control unit 304 returns the process to step S2503. On the other hand, upon determining not to return the processing to the image capturing apparatus 110 (NO in step S2507), the control unit 304 returns the process to step S2506 and continues the processing without changing the processing allocation.

Note that in a case in which the detachable device 100 has a plurality of processing functions capable of executing the same processing, if the processing performance cannot be satisfied after the execution constituent of the part of the processing is transferred to the detachable device 100, the processing function may be switched to the processing function for executing the same function. That is, in step S2507, instead of switching the execution constituent of the processing, the processing function to be used may be changed while keeping the detachable device 100 as the execution constituent.

In addition, even after the execution constituent of the part of the processing is transferred to the detachable device 100, if the processing performance confirmed in step S2502 cannot be satisfied, the control unit 304 may return the execution constituent of the processing to the image capturing apparatus 110. At this time, the control unit 304 can store information representing the processing performance confirmed in step S2502 as the information of the processing performance that cannot be satisfied by the current mounted detachable device 100. If similar processing performance or stricter processing performance is required, the control unit 304 may not cause the detachable device 100 to execute the processing. Similarly, for example, even in a situation in which the processing load of the image capturing apparatus 110 is sufficiently small, if the processing performance confirmed in step S2502 cannot be satisfied, the information of the processing performance may be stored. In this case, in the subsequent processing, if the stored processing performance or stricter processing performance is confirmed in step S2502, the control unit 304 may transfer the execution constituent of a part of the processing on the detachable device 100 without executing the process of step S2503.

According to the first processing example, processing functions provided in the image capturing apparatus 110 and the detachable device 100 are selected, and processing is allocated between the apparatuses and executed to satisfy required processing performance. This makes it possible to perform appropriate processing allocation in accordance with, for example, the state of the image capturing apparatus 110 and maintain satisfactory processing performance.

SECOND PROCESSING EXAMPLE

The second processing example of selecting a processing function to be used will be described next with reference to FIG. 26. This processing is executed when selecting a processing function to be used in a case in which the detachable device 100 has a plurality of processing functions capable of executing the same processing. Note that this processing can be executed in a case in which, for example, it is determined to cause the detachable device 100 to execute some processes in the first processing example. That is, when the detachable device 100 executes processing, this processing can be used by the detachable device 100 to determine which one of one or more processing functions capable of executing the processing should be used. However, this is merely an example, and processing allocation between the image capturing apparatus 110 and the detachable device 100 may be determined by this processing example. For example, if a plurality of processing functions capable of executing the same processing exist in an integrated processing list in which processes executable by the image capturing apparatus 110 and the detachable device 100 are integrated, this processing example may be used to determine which one of the processing functions should be used. That is, if each of the image capturing apparatus 110 and the detachable device 100 has one or more processing functions capable of executing the same processing, this processing example can be used to determine which processing function should be used to execute process in which apparatus.

Figure 25:
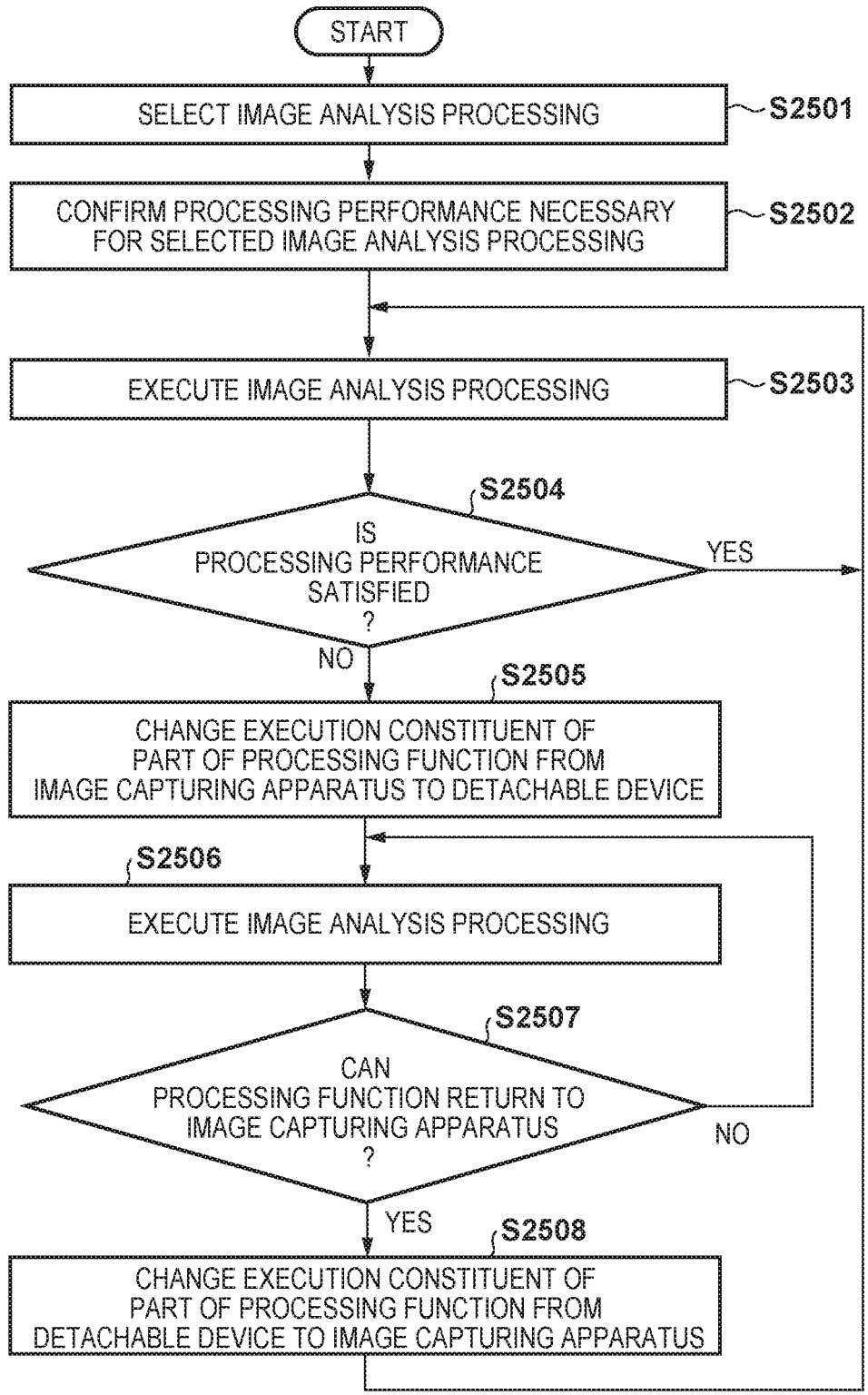
FIG. 25 is a flowchart showing an example of the procedure of selection processing of a processing function to be used.

In this processing, first, as in step S2501 of FIG. 25, the user selects execution target processing on the input/output apparatus 130, and the control unit 304 of the image capturing apparatus 110 obtains information representing the selected processing from the input/output apparatus 130 (step S2601). The control unit 304 confirms the list (second processing list) of processes executable by the detachable device 100, and confirms, for the execution target processing, whether a plurality of processing functions capable of executing the same processing exist (step S2602). Upon determining that only one processing function capable of executing the execution target processing exists (NO in step S2602), the control unit 304 executes the processing using the processing function (step S2603). On the other hand, upon determining that a plurality of processing functions capable of executing the execution target processing exist (YES in step S2602), the control unit 304 advances the process to step S2604 to execute the processing using one of the plurality of processing functions.

In step S2604, the control unit 304 confirms the characteristic of each of the plurality of processing functions capable of executing the same processing that is the determination target of step S2602. Here, concerning, for example, face characteristic extraction, characteristics representing that a first processing function is suitable for processing an image of a relatively high brightness in daytime and a second processing function is suitable for processing an image of a relatively low brightness in nighttime are confirmed. After the difference between the characteristics of the processing functions is confirmed, the control unit 304 confirms the current environment in which the image capturing apparatus 110 is performing image capturing (step S2605). Based on the characteristic of each processing function obtained in step S2604 and the information of the image capturing environment obtain in step S2605, the control unit 304 selects a processing function to be used in actual analysis processing (step S2606), and executes analysis processing using the selected processing function (step S2607).

Here, the confirmation of the image capturing environment can be done based on, for example, the internal clock of the image capturing apparatus 110 or the distribution of brightness values of an image captured by the image capturing apparatus 110. For example, if the internal clock indicates a nighttime zone, a processing function suitable for processing an image of a relatively low brightness value is selected. If the brightness values of the captured image localize on the low brightness side, a processing function suitable for processing an image of a relatively low brightness value is selected. Alternatively, the distribution of evaluation values of detection accuracy for a brightness value may be prepared for each processing function and, for example, a processing function for which the sum of values obtained by multiplying and adding the frequency of each brightness value of a captured image and a value indicating the detection accuracy of the brightness value is most excellent may be selected. The confirmation of the image capturing environment may be done based on, for example, the information of the angle of view (pan/tilt/zoom) at the time of image capturing of the image capturing apparatus 110. For example, a processing function to be used is selected based on, for example, which one of a dark area in a room or a bright area by a window is captured. Note that the characteristic of a processing function may be defined by an index other than the brightness value. For example, various characteristics such as a high face extraction accuracy in an image including a predetermined object such as a window or a high detection accuracy for an object that is moving at a high speed can be used as the reference of selection of a processing function to be used. Additionally, for example, each processing function may have a characteristic representing that processing is performed at a high speed but at a low accuracy or a characteristic representing that processing is performed relatively at a low speed but at a high accuracy. A suitable processing function may be selected in accordance with a processing condition.

The control unit 304 confirms whether the image capturing environment has changed (step S2608). If the image capturing environment has changed (YES in step S2608), the control unit 304 executes the processing of selecting a processing function suitable for the environment after the change again (step S2606), and executes analysis processing by the selected processing function (step S2607). On the other hand, if the image capturing environment has not changed (NO in step S2608), the control unit 304 continues analysis processing without changing the processing function (step S2607).

According to this processing, it is possible to select a processing function suitable for the environment from a plurality of processing functions capable of executing the same processing and use the processing function. This makes it possible to selectively use an appropriate processing function for each environment from the viewpoint of accuracy of processing or the like.

THIRD PROCESSING EXAMPLE

The third processing example of determining allocation of processing between the image capturing apparatus 110 and the detachable device 100 will be described next with reference to FIG. 27. In this processing, allocation of processing is determined based on whether processing can be completed only by the combination of processing functions provided in the detachable device 100.

Figure 26:
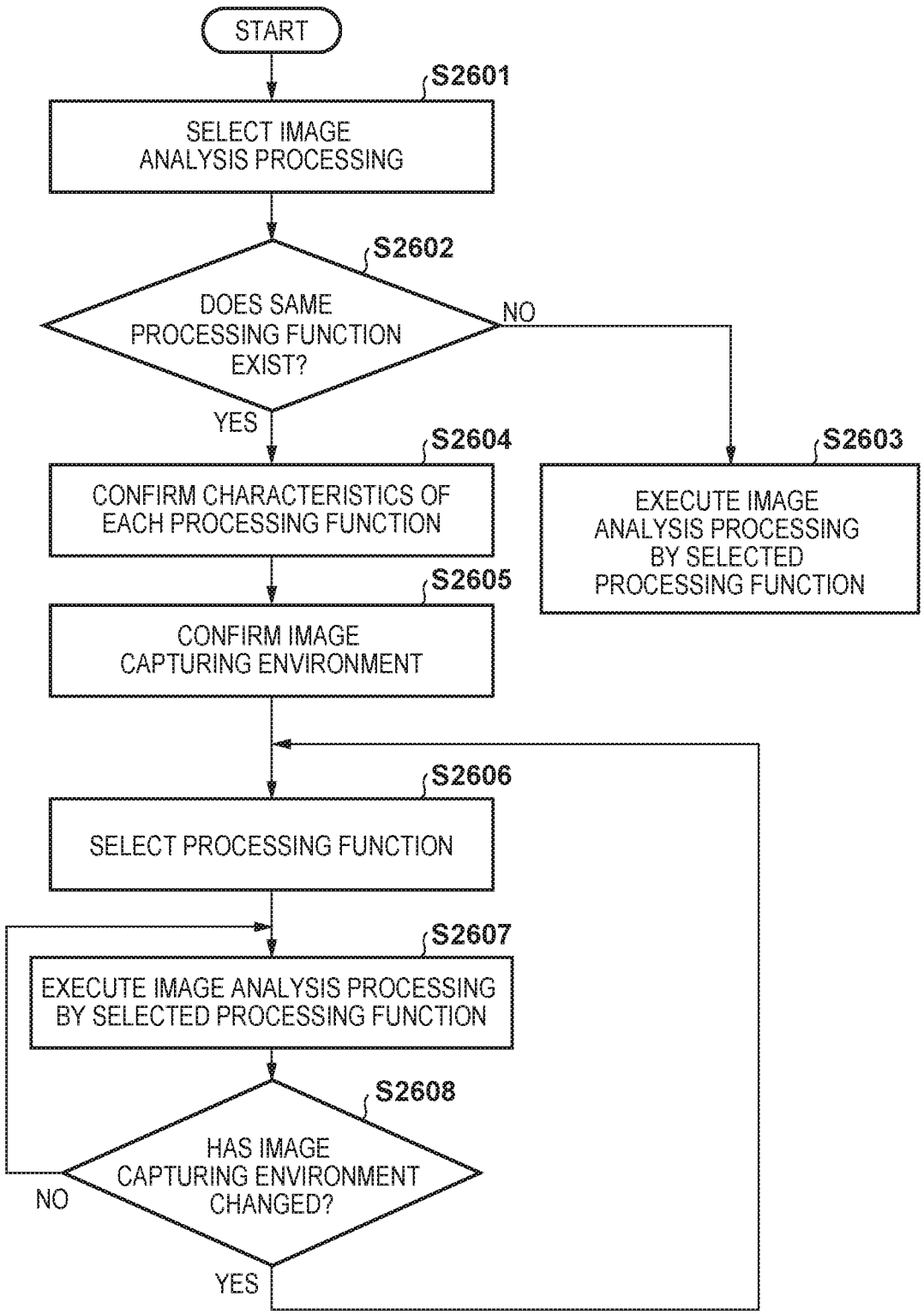
FIG. 26 is a flowchart showing an example of the procedure of selection processing of a processing function to be used.

In this processing, first, as in step S2501 of FIG. 25 or step S2601 of FIG. 26, the user selects execution target processing on the input/output apparatus 130, and the control unit 304 of the image capturing apparatus 110 obtains information representing the selected processing from the input/output apparatus 130 (step S2701). The control unit 304 determines whether the selected processing can be implemented (completed) only by the detachable device 100 (step S2702). Note that the control unit 304 can perform the determination of step S2702 based on, for example, whether all functions of the selected processing can be satisfied by the combinations of processing functions provided in the detachable device 100 or whether a processing result can be stored in the detachable device 100. For example, if all functions of the selected processing can be satisfied by the combinations of the processing functions provided in the detachable device 100, and the processing result can be stored in the detachable device 100, the control unit 304 determines that the processing can be completed only by the detachable device 100.

Upon determining that the selected processing cannot be completed only by the detachable device 100 (NO in step S2702), the control unit 304 allocates the processing between the image capturing apparatus 110 and the detachable device 100 (step S2703). In this case, processing allocation in the first processing example and the second processing example can be performed. Note that in this case, all processes may be executed by the image capturing apparatus 110, that is, use of the processing functions of the detachable device 100 may be inhibited. On the other hand, upon determining that the selected processing can be completed only by the detachable device 100 (YES in step S2702), the control unit 304 selects which processing function of the processing functions provided in the detachable device 100 should be used (step S2704). Note that if the detachable device 100 has a plurality of processing functions capable of executing the same processing, which processing function should be used is selected as in the second processing example. After that, the control unit 304 executes processing of causing the detachable device 100 to execute image analysis processing using the selected processing function (step S2705). In addition, the control unit 304 executes processing of storing, in the detachable device 100, the result of performing image analysis processing in step S2705 (step S2706). These processes are executed using, for example, commands of the SD standard. Note that in step S2706, the result may be stored in the storage unit 404, or if a RAM is provided in the FPGA 402, the result may be stored in the RAM.

In this processing example, if processing can be completed in the detachable device 100, the detachable device 100 is caused to execute the processing. Accordingly, processing to be executed by the image capturing apparatus 110 is only image transmission to the detachable device 100, and the processing load can greatly be reduced.

In the above-described way, functions executable on the side of the image capturing apparatus 110 are increased using the detachable device 100, thereby enhancing processing functions in the system. For example, when a latest processing function is implemented in the detachable device 100, image analysis processing by the latest processing function can be executed on the side of the image capturing apparatus 110 without replacing the image capturing apparatus 110. This can flexibly operate the system and improve the convenience.

In the above-described embodiment, image analysis processing has been described as an example of analysis processing. However, the present invention is also applicable to sound analysis processing. For example, the present invention can be applied to processing of detecting a sound pattern such as a scream, a gunshot, or glass breaking sound. For example, a characteristic amount of a sound is extracted by various sound data analysis methods such as spectrum analysis and compared with the detected sound pattern. By calculating the degree of matching, a specific sound pattern can be detected.

When performing sound analysis processing, sound data is divided into sound data of a predetermined time, sound analysis processing is performed using the sound data of the predetermined time as a unit. In addition, the predetermined time appropriately changes depending on the sound pattern of the detection target. For this reason, sound data of a time corresponding to a sound pattern to be detected is input to the detachable device 100. The detachable device 100 has a function of analyzing the input sound data or a function of holding the input sound data.

In the above-described embodiment, the detachable device 100 capable of non-temporarily storing data input from the image capturing apparatus 110 has been described as an example. However, in some embodiments, the detachable device 100 that cannot non-temporarily store data input from the image capturing apparatus 110 may be used. That is, the detachable device 100 may only perform analysis processing for data input from the image capturing apparatus 110, and may not non-temporarily store the data. In other words, the detachable device 100 aiming not at storing data, like a normal SD card, but at only analysis processing may be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-171852, filed Sep. 20, 2019 which is hereby incorporated by reference herein in its entirety.

What is claimed is:

1. An image capturing apparatus including a mounting part capable of attaching/detaching a device capable of at least storing a captured image, comprising:
   one or more processors; and
   one or more memories storing instructions which, when executed by the one or more processors, cause the one or more processors to function as:
   a generation unit configured to generate image data based on the captured image;
   a determination unit configured to determine a method to be used to obtain a result of image analysis processing from the device based on information obtained from the device if the device mounted in the mounting part can execute image analysis processing for the image data, wherein the method is one of a first method and a second method, wherein, in the first method, the image capturing apparatus receives a response to a first command used to output the image data by the image capturing apparatus to the device, the response including the result of the image analysis processing, wherein, in the second method, the image capturing apparatus outputs a second command different from the first command to the device and reads out the result from the device based on the second command, and wherein in the first method, a response including a result of the image analysis processing for second image data output to the device before first image data is received in correspondence with a command configured to output the first image data to the device;
   an output unit configured to output the image data to the device; and
   an obtaining unit configured to obtain the result from the device using the method determined by the determination unit.

2. The apparatus according to claim 1, wherein when using the first method, the determination unit determines, based on the information obtained from the device, a timing after the image data is output to the device until a response including the result of the image analysis processing for the image data is received.

3. The apparatus according to claim 2, wherein the timing is based on a time after processing is started in the image analysis processing until the processing is ended.

4. The apparatus according to claim 1, wherein the response is received from the device within a predetermined time after the first command is transmitted.

5. The apparatus according to claim 1, wherein the instructions cause, when executed by the one or more processors, the one or more processors to function as a specifying unit configured to specify a data length of data representing the result, wherein the determination unit selects the method to be used based on the specified data length and requests the device to use the selected method, thereby determining the method to be used.

6. The apparatus according to claim 5, wherein the specifying unit specifies the data length by obtaining information concerning the data length from the device.

7. The apparatus according to claim 5, wherein the specifying unit specifies the data length based on information of the image analysis processing.

8. The apparatus according to claim 1, wherein the determination unit determines the method to be used based on the information obtained from the device before the output of the image data by the output unit.

9. A control method executed by an image capturing apparatus including a mounting part capable of attaching/detaching a device capable of at least storing a captured image, comprising:

generating image data based on the captured image;

determining a method to be used to obtain a result of image analysis processing from the device based on information obtained from the device if the device mounted in the mounting part can execute image analysis processing for the image data, wherein the method is one of a first method and a second method wherein in the first method, the image capturing apparatus receives a response to a first command used to output the image data by the image capturing apparatus to the device, the response including the result of the image analysis processing, wherein, in the second method, the image capturing apparatus outputs a second command different from the first command to the device and reads out the result from the device based on the second command, and wherein in the first method, a response including a result of the image analysis processing for second image data output to the device before first image data is received in correspondence with a command configured to output the first image data to the device;

outputting the image data to the device; and obtaining the result from the device using the determined method.

10. A non-transitory computer-readable storage medium that stores a program configured to cause a computer provided in an image capturing apparatus including a mounting part capable of attaching/detaching a device capable of at least storing a captured image to:

generate image data based on the captured image;

determine a method to be used to obtain a result of image analysis processing from the device based on information obtained from the device if the device mounted in the mounting part can execute image analysis processing for the image data, wherein the method is one of a first method and a second method, wherein, in the first method, the image capturing apparatus receives a response to a first command used to output the image data by the image capturing apparatus to the device, the response including the result of the image analysis processing, wherein, in the second method, the image capturing apparatus outputs a second command different from the first command to the device and reads out the result from the device based on the second command, and wherein in the first method, a response including a result of the image analysis processing for second image data output to the device before first image data is received in correspondence with a command configured to output the first image data to the device;

output the image data to the device; and obtain the result from the device using the determined method.

* * * * *